(12) United States Patent
Shimada et al.

(10) Patent No.: US 12,492,944 B2
(45) Date of Patent: Dec. 9, 2025

(54) IMAGING CONTROL DEVICE, IMAGING APPARATUS, IMAGING CONTROL METHOD, AND PROGRAM

(71) Applicant: FUJIFILM Corporation, Tokyo (JP)

(72) Inventors: Tomoharu Shimada, Saitama (JP); Tetsuya Fujikawa, Saitama (JP); Shinichi Shimotsu, Saitama (JP); Toshihiro Aoi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 179 days.

(21) Appl. No.: 18/472,255

(22) Filed: Sep. 22, 2023

(65) Prior Publication Data

US 2024/0015377 A1 Jan. 11, 2024

Related U.S. Application Data

(63) Continuation of application No. PCT/JP2022/000784, filed on Jan. 12, 2022.

(30) Foreign Application Priority Data

Mar. 31, 2021 (JP) .................. 2021-061522

(51) Int. Cl.
*G01J 5/48* (2022.01)
*G01J 5/00* (2022.01)
(Continued)

(52) U.S. Cl.
CPC .............. *G01J 5/485* (2022.01); *H04N 5/265* (2013.01); *H04N 23/21* (2023.01); *H04N 23/23* (2023.01);
(Continued)

(58) Field of Classification Search
None
See application file for complete search history.

(56) References Cited

U.S. PATENT DOCUMENTS

| 10,764,514 B1* | 9/2020 | Hoevenaar | G01J 5/025 |
| 2008/0284880 A1* | 11/2008 | Numata | H04N 23/71 |
| | | | 348/241 |

(Continued)

FOREIGN PATENT DOCUMENTS

| JP | H08226853 | 9/1996 |
| JP | 2006185410 | 7/2006 |

(Continued)

OTHER PUBLICATIONS

"International Search Report (Form PCT/ISA/210) of PCT/JP2022/000784", mailed on Mar. 8, 2022, with English translation thereof, pp. 1-5.

(Continued)

*Primary Examiner* — Stefan Gadomski
(74) *Attorney, Agent, or Firm* — JCIPRNET

(57) ABSTRACT

Provided is an imaging control device including: a processor; and a memory connected to or built in the processor. The processor acquires a first image by causing an image sensor of an imaging apparatus to image first light with a first sensitivity, and acquires a second image by causing the image sensor to image second light with a second sensitivity. The first sensitivity is a sensitivity for representing shape information of a subject with a first gradation in the first image. The second sensitivity is a sensitivity for representing temperature information of the subject with a second gradation in the second image.

15 Claims, 20 Drawing Sheets

(51) Int. Cl.
*H04N 5/265* (2006.01)
*H04N 23/21* (2023.01)
*H04N 23/23* (2023.01)
*H04N 23/75* (2023.01)
*H04N 23/76* (2023.01)
*H04N 23/95* (2023.01)

(52) U.S. Cl.
CPC ............. *H04N 23/75* (2023.01); *H04N 23/76* (2023.01); *H04N 23/95* (2023.01); *G01J 2005/0077* (2013.01)

(56) References Cited

U.S. PATENT DOCUMENTS

| | | | |
|---|---|---|---|
| 2009/0008552 | A1 | 1/2009 | Tadano |
| 2016/0065926 | A1* | 3/2016 | Nonaka .................. H04N 23/88 348/164 |
| 2018/0096468 | A1* | 4/2018 | Nguyen ............... H04N 23/741 |
| 2018/0255256 | A1* | 9/2018 | Park ....................... H04N 23/84 |
| 2021/0033471 | A1 | 2/2021 | Nakamura et al. |

FOREIGN PATENT DOCUMENTS

| | | |
|---|---|---|
| JP | 2007208776 | 8/2007 |
| JP | 2009014475 | 1/2009 |
| JP | 2009244083 | 10/2009 |
| JP | 2020062198 | 4/2020 |
| WO | 2019203351 | 10/2019 |

OTHER PUBLICATIONS

"Written Opinion of the International Searching Authority (Form PCT/ISA/237) of PCT/JP2022/000784", mailed on Mar. 8, 2022, with English translation thereof, pp. 1-8.

* cited by examiner

IMAGING CONTROL DEVICE, IMAGING APPARATUS, IMAGING CONTROL METHOD, AND PROGRAM

This application is a continuation application of International Application No. PCT/JP2022/000784, filed Jan. 12, 2022, the disclosure of which is incorporated herein by reference in its entirety. Further, this application claims priority under 35 USC 119 from Japanese Patent Application No. 2021-061522 filed Mar. 31, 2021, the disclosure of which is incorporated by reference herein.

BACKGROUND OF THE INVENTION

1. Field of the Invention

The technology of the present disclosure relates to an imaging control device, an imaging apparatus, an imaging control method, and a program.

2. Description of the Related Art

JP1996-226853A (JP-H8-226853A) discloses an infrared thermal imaging apparatus that displays a thermal image of an object on a display device by detecting infrared rays emitted from the object to generate thermal image digital data and converting this data into an analog image signal with a D/A converter, the infrared thermal imaging device including: a thermal image data generation unit that generates, from an output signal of an infrared sensor, thermal image data that has been subjected to processing for division display that divides a screen of the display device into a plurality of divided regions and in which a temperature level of each pixel in horizontal and vertical directions is expressed in a predetermined gradation; a control signal generation unit that generates a control signal indicating a period of each divided region in the thermal image data; a temperature range selection unit that determines, based on the control signal, which divided region the thermal image data output from the thermal image data generation unit corresponds to, and that selects and outputs, from temperature range data indicating a designated temperature range set for each region, data of the region; and a temperature range changing unit that converts the thermal image data into thermal image data displayed in the temperature range indicated by the temperature range data and outputs the converted thermal image data to the D/A converter.

JP2009-14475A discloses a far-infrared image processing apparatus that processes an image captured by detecting far-infrared rays emitted from an object, the far-infrared image processing apparatus including: an image signal reception unit that receives an image signal indicating a far-infrared image captured by a far-infrared camera; a region designation reception unit that receives an input of region designation information indicating a specific region of the far-infrared image; and a resolution conversion unit that converts a resolution for the amount of the far-infrared rays applicable to the specific region indicated by the region designation information in the far-infrared image, thereby generating resolution-converted image information.

JP2009-244083A discloses a display color switching apparatus that comprises, in a display that displays a surface temperature distribution of a measurement target captured by a thermal imaging camera: a thermal image display area; a display screen where a color bar display area is designed; gradation tables of an optional number of two or more that define gradations for the color bar display area that allow a visual conversion from a display color to a surface temperature; and means for changing a plurality of the displayed gradation tables by clicking a part of the display screen.

SUMMARY OF THE INVENTION

One embodiment according to the technology of the present disclosure provides an imaging control device, an imaging apparatus, an imaging control method, and a program capable of acquiring a first image in which shape information of a subject is represented by a first gradation and a second image in which temperature information of the subject is represented by a second gradation.

A first aspect according to the technology of the present disclosure provides an imaging control device comprising: a processor; and a memory connected to or built in the processor, in which the processor acquires a first image by causing an image sensor of an imaging apparatus to image first light with a first sensitivity, and acquires a second image by causing the image sensor to image second light with a second sensitivity, the first sensitivity is a sensitivity for representing shape information of a subject with a first gradation in the first image, and the second sensitivity is a sensitivity for representing temperature information of the subject with a second gradation in the second image.

A second aspect according to the technology of the present disclosure provides the imaging control device according to the first aspect, in which the shape information includes contour information.

A third aspect according to the technology of the present disclosure provides the imaging control device according to the first aspect or the second aspect, in which the processor generates a composite image based on the first image and the second image.

A fourth aspect according to the technology of the present disclosure provides the imaging control device according to the third aspect, in which the processor generates temperature distribution information corresponding to the temperature information, and the composite image is an image representing the shape information and the temperature distribution information.

A fifth aspect according to the technology of the present disclosure provides the imaging control device according to the fourth aspect, in which the composite image is an image in which the temperature distribution information is superimposed on the first image.

A sixth aspect according to the technology of the present disclosure provides the imaging control device according to the fourth aspect or the fifth aspect, in which the temperature distribution information is information representing a temperature distribution with a visual feature amount.

A seventh aspect according to the technology of the present disclosure provides the imaging control device according to any one of the fourth aspect to the sixth aspect, in which the temperature distribution information is a translucent image.

An eighth aspect according to the technology of the present disclosure provides the imaging control device according to any one of the third aspect to the seventh aspect, in which the processor outputs display data for displaying the composite image on a display.

A ninth aspect according to the technology of the present disclosure provides the imaging control device according to any one of the first aspect to the eighth aspect, in which the processor sets a first frequency of acquiring the first image higher than a second frequency of acquiring the second image.

A tenth aspect according to the technology of the present disclosure provides the imaging control device according to any one of the first aspect to the ninth aspect, in which the first sensitivity and the second sensitivity are defined based on a signal amplification factor of an imaging signal obtained by the imaging of the image sensor.

An eleventh aspect according to the technology of the present disclosure provides the imaging control device according to the tenth aspect, in which the signal amplification factor corresponding to the first sensitivity is logarithmically defined, and the signal amplification factor corresponding to the second sensitivity is exponentially defined.

A twelfth aspect according to the technology of the present disclosure provides the imaging control device according to any one of the first aspect to the eleventh aspect, in which the first sensitivity is higher than the second sensitivity.

A thirteenth aspect according to the technology of the present disclosure provides the imaging control device according to any one of the first aspect to the twelfth aspect, in which the processor changes at least one of the first sensitivity or the second sensitivity based on an instruction from an outside or information obtained from the subject.

A fourteenth aspect according to the technology of the present disclosure provides the imaging control device according to any one of the first aspect to the thirteenth aspect, in which the first light and the second light are near-infrared light.

A fifteenth aspect according to the technology of the present disclosure provides the imaging control device according to any one of the first aspect to the ninth aspect, in which the imaging control device further comprises a stop mechanism that changes an amount of light received by the image sensor, and the first sensitivity and the second sensitivity are defined based on a change in the amount of light.

A sixteenth aspect according to the technology of the present disclosure provides an imaging apparatus comprising: the imaging control device according to any one of the first aspect to the fifteenth aspect; and the image sensor controlled by the imaging control device.

A seventeenth aspect according to the technology of the present disclosure provides an imaging control method comprising: acquiring a first image by causing an image sensor of an imaging apparatus to image first light with a first sensitivity; and acquiring a second image by causing the image sensor to image second light with a second sensitivity, in which the first sensitivity is a sensitivity for representing shape information of a subject with a first gradation in the first image, and the second sensitivity is a sensitivity for representing temperature information of the subject with a second gradation in the second image.

A eighteenth aspect according to the technology of the present disclosure provides a program causing a computer to execute a process comprising: acquiring a first image by causing an image sensor of an imaging apparatus to image first light with a first sensitivity; and acquiring a second image by causing the image sensor to image second light with a second sensitivity, in which the first sensitivity is a sensitivity for representing shape information of a subject with a first gradation in the first image, and the second sensitivity is a sensitivity for representing temperature information of the subject with a second gradation in the second image.

DESCRIPTION OF THE PREFERRED EMBODIMENTS

Figure 1:
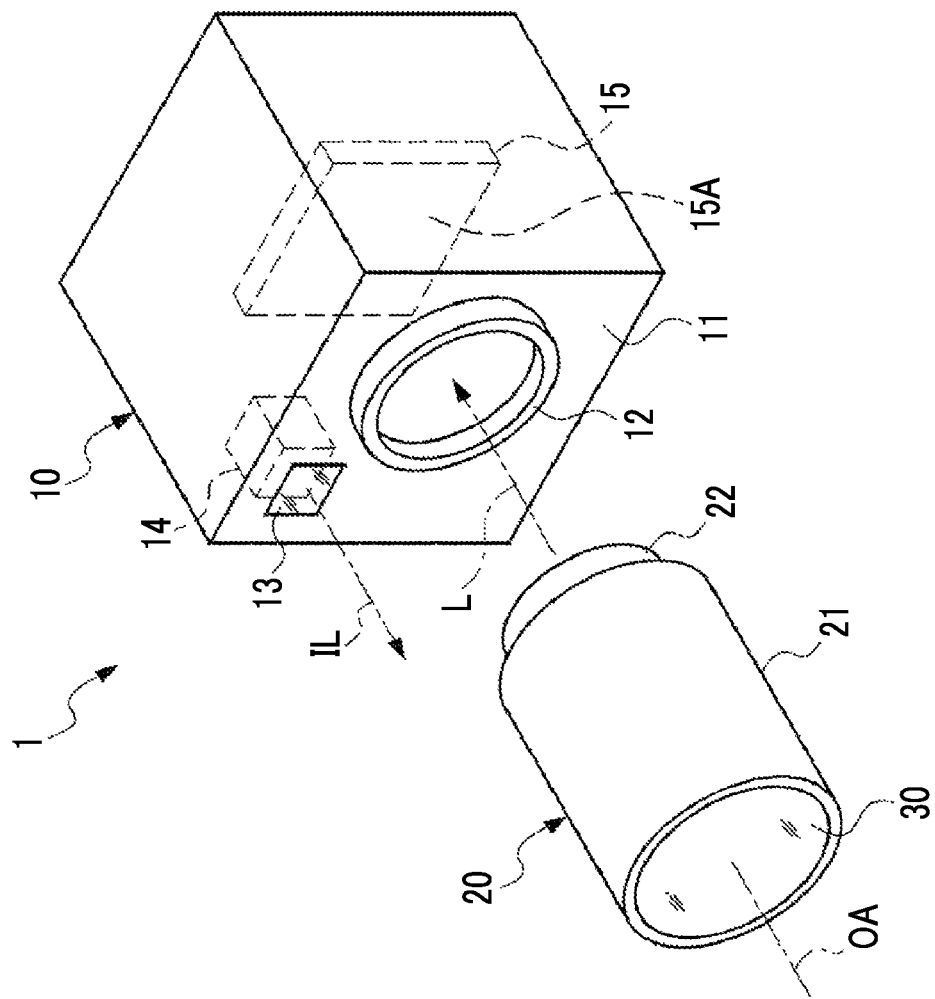
FIG. 1 is a perspective view showing an example of a camera according to one embodiment of the technology of the present disclosure.

Hereinafter, an example of an embodiment of an imaging control device, an imaging apparatus, an imaging control method, and a program according to the technology of the present disclosure will be described with reference to the accompanying drawings.

First, the wording used in the following description will be described.

CPU is an abbreviation for "central processing unit". GPU is an abbreviation for "graphics processing unit". NVM is an abbreviation for "non-volatile memory". RAM is an abbreviation for "random access memory". IC is an abbreviation for "integrated circuit". ASIC is an abbreviation for "application specific integrated circuit". PLD is an abbreviation for "programmable logic device". FPGA is an abbreviation for "field-programmable gate array". SoC is an abbreviation for "system-on-a-chip". SSD is an abbreviation for "solid state drive". HDD is an abbreviation for "hard disk drive". EEPROM is an abbreviation for "electrically erasable and programmable read only memory". SRAM is an abbreviation for "static random access memory". I/F is an abbreviation for "interface". USB is an abbreviation for "universal serial bus". CMOS is an abbreviation for "complementary metal oxide semiconductor". CCD is an abbreviation for "charge coupled device". LAN is an abbreviation for "local area network". WAN is an abbreviation for "wide area network". BPF is an abbreviation for "band pass filter". Ir is an abbreviation for "infrared rays". LED is an abbreviation for "light emitting diode". EL is an abbreviation for "electro luminescence". A/D is an abbreviation for "analog/digital".

In the description of the present specification, the term "vertical" indicates a vertical in the sense of including an error generally allowed in the technical field, to which the technology of the present disclosure belongs, and an error that does not go against the gist of the technology of the present disclosure, in addition to the perfect vertical. In the description of the present specification, the term "parallel" indicates a parallel in the sense of including an error generally allowed in the technical field, to which the technology of the present disclosure belongs, and an error that does not go against the gist of the technology of the present disclosure, in addition to the perfect parallel. In the description of the present specification, the term "match" indicates a match in the sense of including an error generally allowed in the technical field, to which the technology of the present disclosure belongs, and an error that does not go against the gist of the technology of the present disclosure, in addition to the perfect match. In the description of the present specification, the term "equal interval" indicates an equal interval in the sense of including an error generally allowed in the technical field, to which the technology of the present disclosure belongs, and an error that does not go against the gist of the technology of the present disclosure, in addition to the perfect equal interval.

As an example, as shown in FIG. 1, a camera 1 comprises a camera body 10 and a lens unit 20. The camera 1 is an example of an "imaging apparatus" according to the technology of the present disclosure. A camera-side mount 12 for attaching the lens unit 20 is provided on a front surface 11 of the camera body 10. In addition, an irradiation window 13 for irradiating a subject with illumination light IL is provided on the front surface 11 of the camera body 10.

The camera body 10 comprises a light source 14 that generates the illumination light IL. The light source 14 is, for example, an LED that emits near-infrared light having a peak wavelength of 1550 nm as the illumination light IL. The light source 14 may be a halogen light. The illumination light IL generated by the light source 14 is transmitted through the irradiation window 13 and is emitted forward of the camera body 10.

In addition, the camera body 10 comprises an image sensor 15. The image sensor 15 images light L incident from the subject through the lens unit 20. In the present embodiment, a CMOS image sensor is exemplified as the image sensor 15, but the technology of the present disclosure is not limited to this. For example, the technology of the present disclosure is established even in a case in which the image sensor 15 is another type of image sensor, such as a CCD image sensor.

The lens unit 20 comprises a lens barrel 21 and a lens-side mount 22. The lens-side mount 22 is provided at a rear end portion of the lens barrel 21. The lens-side mount 22 is configured to be connectable to the camera-side mount 12 of the camera body 10. The lens unit 20 is attachably and detachably attached to the camera body 10 by a lens-side mount 22.

Figure 2:
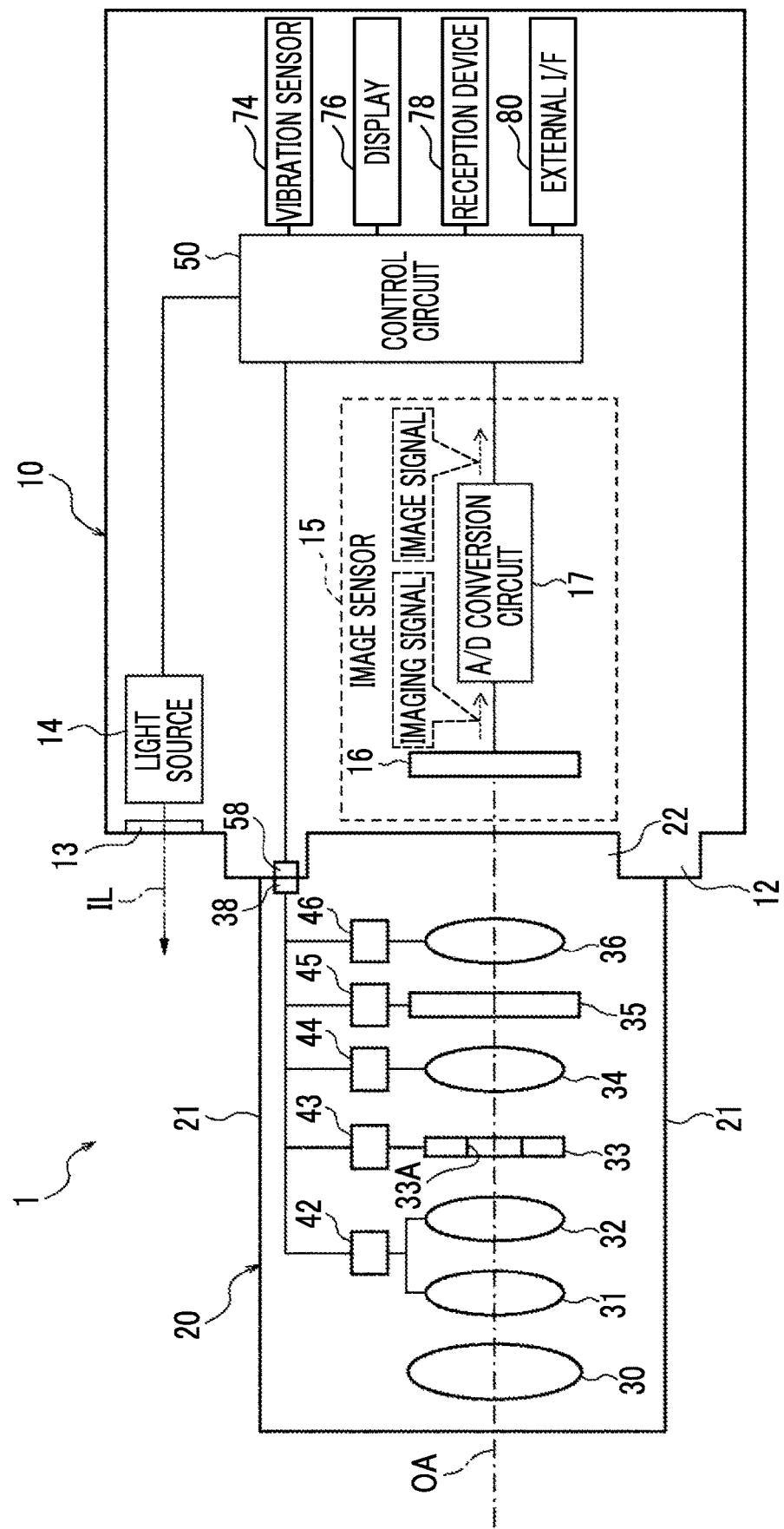
FIG. 2 is a block diagram showing an example of an internal configuration of the camera according to the embodiment.

As an example, as shown in FIG. 2, the lens unit 20 comprises an objective lens 30, a focus lens 31, a zoom lens 32, a stop 33, a shake correction lens 34, a turret filter 35, and an adjustment lens 36. The objective lens 30, the focus lens 31, the zoom lens 32, the stop 33, the shake correction lens 34, the turret filter 35, and the adjustment lens 36 are disposed in order from a subject side to an image side along an optical axis OA of the lens unit 20.

The objective lens 30 is a lens that is fixed to a tip end portion of the lens barrel 21 and that collects light. The focus lens 31 is a lens for adjusting an in-focus position of an image. The zoom lens 32 is a lens for adjusting a zoom magnification.

The stop 33 is an optical element for adjusting an amount of light. The stop 33 has an opening 33A. The light guided by the zoom lens 32 passes through the opening 33A. The stop 33 is a movable stop in which a diameter of the opening 33A is variable. An amount of the light guided by the zoom lens 32 is changed by the stop 33. The shake correction lens 34 is a lens for correcting an image shake.

The turret filter 35 has a plurality of optical filters. The turret filter 35 is an optical element that selectively transmits light in a plurality of wavelength ranges (for example, visible light, and near-infrared light in different wavelength ranges within a near-infrared wavelength range) included in the light by switching an optical filter that is inserted into an optical path of the light in the lens unit 20 among the plurality of optical filters. The optical path of the light in the lens unit 20 is located, for example, on the optical axis OA. Hereinafter, the optical path of the light in the lens unit 20 will be simply referred to as an optical path. The configuration of the turret filter 35 will be described in detail below with reference to FIG. 4.

The adjustment lens 36 is a lens for adjusting a difference in focal length in a case in which the plurality of optical filters included in the turret filter 35 are switched.

The arrangement order of the focus lens 31, the zoom lens 32, the stop 33, the shake correction lens 34, the turret filter 35, and the adjustment lens 36 may be other than the above. In addition, each of the objective lens 30, the focus lens 31, the zoom lens 32, the shake correction lens 34, and the adjustment lens 36 may be a single lens or a lens group including a plurality of lenses. In addition, the lens unit 20 may comprise other lenses in addition to the focus lens 31, the zoom lens 32, the shake correction lens 34, and the adjustment lens 36. In addition, the lens unit 20 may comprise an optical element such as a half mirror or a polarizer.

As an example, as shown in FIG. 2, the lens unit 20 comprises a zoom drive mechanism 42, a stop drive mechanism 43, a shake correction drive mechanism 44, a turret drive mechanism 45, and an adjustment drive mechanism 46. The zoom drive mechanism 42, the stop drive mechanism 43, the shake correction drive mechanism 44, the turret drive mechanism 45, and the adjustment drive mechanism 46 are electrically connected to an electric contact 38 provided at the rear end portion of the lens barrel 21.

The camera body 10 comprises a control circuit 50. The control circuit 50 is an example of an "imaging control device" according to the technology of the present disclosure. The control circuit 50 is electrically connected to an electric contact 58 provided on the camera-side mount 12. In a state where the lens-side mount 22 is connected to the camera-side mount 12 and the lens unit 20 is attached to the camera body 10, the electric contact 38 is connected to the electric contact 58, and the control circuit 50 is electrically connected to the zoom drive mechanism 42, the stop drive mechanism 43, the shake correction drive mechanism 44, the turret drive mechanism 45, and the adjustment drive mechanism 46.

The zoom drive mechanism 42, the stop drive mechanism 43, the shake correction drive mechanism 44, the turret drive mechanism 45, and the adjustment drive mechanism 46 are all drive mechanisms including an actuator such as a motor.

Figure 3:
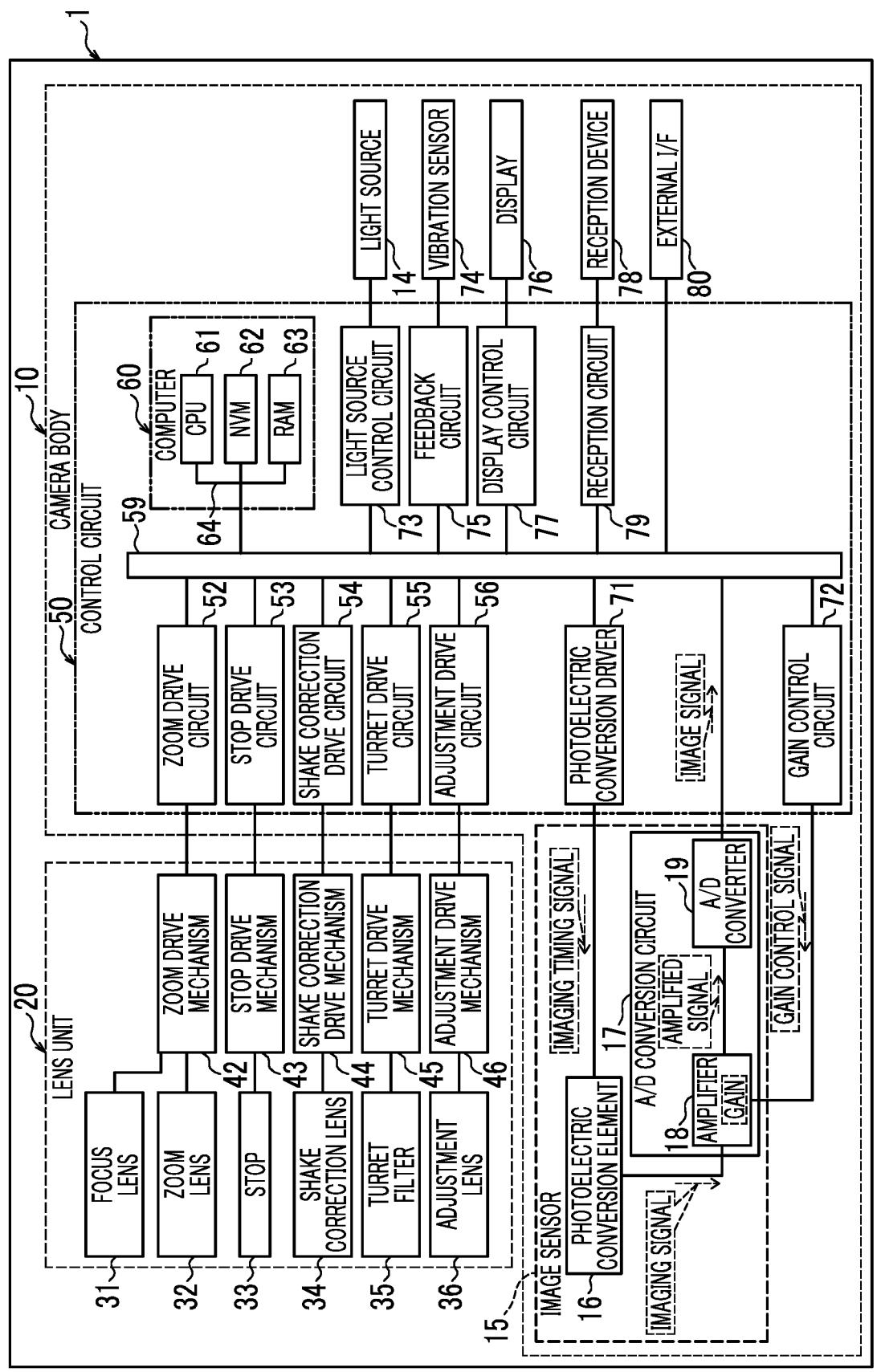
FIG. 3 is a block diagram showing an example of an electric configuration of the camera according to the embodiment.

As an example, as shown in FIG. 3, the control circuit 50 comprises a computer 60, a zoom drive circuit 52, a stop drive circuit 53, a shake correction drive circuit 54, a turret drive circuit 55, and an adjustment drive circuit 56. The zoom drive circuit 52, the stop drive circuit 53, the shake correction drive circuit 54, the turret drive circuit 55, and the adjustment drive circuit 56 are connected to the computer 60 via an input/output I/F 59.

The computer 60 comprises a CPU 61, an NVM 62, and a RAM 63. The CPU 61, the NVM 62, and the RAM 63 are connected to each other via a bus 64, and the bus 64 is connected to the input/output I/F 59.

The NVM 62 is a non-transitory storage medium, and stores various parameters and various programs. For example, the NVM 62 is an EEPROM. Note that this is merely an example, and an HDD and/or SSD or the like may be applied as the NVM 62 instead of or together with the EEPROM. The RAM 63 transitorily stores various types of information, and is used as a work memory. The CPU 61 reads out a necessary program from the NVM 62 and executes the read-out program in the RAM 63. The CPU 61 controls the entire camera 1 in accordance with the program executed on the RAM 63.

The zoom drive circuit 52 adjusts a position of the focus lens 31 and a position of the zoom lens 32 by driving the zoom drive mechanism 42 in accordance with an instruction of the computer 60. The focus lens 31 and the zoom lens 32 move along the optical axis OA (see FIG. 2) of the lens unit 20 by receiving power from the zoom drive mechanism 42.

The stop drive circuit 53 drives the stop drive mechanism 43 in accordance with an instruction of the computer 60 to change the diameter of the opening 33A (see FIG. 2) provided in the stop 33.

The shake correction drive circuit 54 adjusts a position of the shake correction lens 34 by driving the shake correction drive mechanism 44 in accordance with an instruction from the computer 60 and a feedback signal (not shown) input from a feedback circuit 75 described below. The shake correction lens 34 moves along a plane perpendicular to the optical axis OA of the lens unit 20 by receiving power from the shake correction drive mechanism 44. Specifically, the shake correction lens 34 moves in a direction in which a shake of an image obtained by forming an image of light on the image sensor 15 is corrected.

The turret drive circuit 55 adjusts a position of the turret filter 35 in a rotation direction by driving the turret drive mechanism 45 in accordance with an instruction of the computer 60. The turret filter 35 rotates along a plane perpendicular to the optical axis OA of the lens unit 20 by receiving power from the turret drive mechanism 45. The rotational operation of the turret filter 35 will be described in detail below with reference to FIG. 4.

The adjustment drive circuit 56 adjusts a position of the adjustment lens 36 by driving the adjustment drive mechanism 46 in accordance with an instruction of the computer 60. The adjustment lens 36 moves along the optical axis OA of the lens unit 20 by receiving power from the adjustment drive mechanism 46.

As an example, as shown in FIG. 3, the camera body 10 comprises the image sensor 15, a photoelectric conversion driver 71, a gain control circuit 72, a light source control circuit 73, a vibration sensor 74, the feedback circuit 75, a display 76, a display control circuit 77, a reception device 78, a reception circuit 79, and an external I/F 80. The photoelectric conversion driver 71, the gain control circuit 72, the light source control circuit 73, the feedback circuit 75, the display control circuit 77, the reception circuit 79, and the external I/F 80 are connected to the computer 60 via the input/output I/F 59.

The image sensor 15 includes a photoelectric conversion element 16 and an A/D conversion circuit 17. The photoelectric conversion element 16 has a plurality of photodiodes. The plurality of photodiodes are disposed in a matrix on a light-receiving surface of the photoelectric conversion element 16. The plurality of photodiodes includes a plurality of silicon photodiodes having a sensitivity to visible light and a plurality of indium gallium arsenic photodiodes having a sensitivity to near-infrared light. Hereinafter, a silicon photodiode will be referred to as an Si diode, and an indium gallium arsenic photodiode will be referred to as an InGaAs diode.

The Si diode photoelectrically converts the received visible light and outputs a photoelectric conversion signal according to the amount of received light. The InGaAs diode photoelectrically converts the received near-infrared light and outputs a photoelectric conversion signal according to the amount of received light. The photoelectric conversion signal output from the Si diode and the photoelectric conversion signal output from the InGaAs diode are output from the photoelectric conversion element as an imaging signal. The imaging signal is an analog signal.

The A/D conversion circuit 17 includes an amplifier 18 and an A/D converter 19. The amplifier 18 amplifies the imaging signal input from the photoelectric conversion element 16 to generate an amplified signal, and outputs the amplified signal. As an example, the amplifier 18 is a gain variable amplifier that can change a gain. The gain is a ratio of a value of the amplified signal to a value of the imaging signal, and is defined based on a signal amplification factor of the imaging signal. An amplified signal, which is an analog signal, is input to the A/D converter 19 from the amplifier 18. The A/D converter 19 generates an image signal, which is a digital signal, by performing A/D conversion of the amplified signal input from the amplifier 18, and outputs the generated image signal. The imaging signal output from the photoelectric conversion element is an example of the "imaging signal obtained by the imaging of the image sensor" according to the technology of the present disclosure, and the gain is an example of the "sensitivity" and the "sensitivity" and the "signal amplification factor" according to the technology of the present disclosure. For example, in the present embodiment, the gain is changed for the analog signal, but it is needless to say that the gain may be changed for the digital signal.

The gain control circuit 72 changes the gain of the amplifier 18 in accordance with an instruction of the computer 60. Specifically, the gain control circuit 72 outputs, to the amplifier 18, a gain control signal for defining the gain of the amplifier 18 in accordance with an instruction from the computer 60. The gain control signal is input to the amplifier 18 from the gain control circuit 72. The amplifier 18 changes the gain in accordance with the gain control signal input from the gain control circuit 72.

The photoelectric conversion driver 71 causes the photoelectric conversion element 16 to image light in accordance with an instruction of the computer 60. Specifically, the photoelectric conversion driver 71 outputs an imaging timing signal for defining a timing of the imaging performed by the photoelectric conversion element 16, to the photoelectric conversion element 16 in accordance with an instruction from the computer 60. The photoelectric conversion element 16 performs reset, exposure, and output of an imaging signal in accordance with the imaging timing signal input from the photoelectric conversion driver 71. Examples of the imaging timing signal include a vertical synchronization signal, and a horizontal synchronization signal.

The light source control circuit 73 switches the light source 14 on and off in accordance with an instruction from the computer 60. The light source 14 outputs the illumination light IL (see FIGS. 1 and 2) in a case in which the light source 14 is switched on, and stops the output of the illumination light IL in a case in which the light source 14 is switched off.

The vibration sensor 74 is, for example, a gyro sensor and detects vibration of the camera 1. The gyro sensor included in the vibration sensor 74 detects vibration around each of a pitch axis and a yaw axis of the camera 1. The vibration sensor 74 converts the vibration around the pitch axis and the vibration around the yaw axis, which are detected by the gyro sensor, into vibration in a two-dimensional plane parallel to the pitch axis and the yaw axis, thereby detecting vibration acting on the camera 1 in a direction of the pitch axis and vibration acting on the camera 1 in a direction of the yaw axis. The vibration sensor 74 outputs a vibration detection signal (not shown) corresponding to the detected vibration.

The vibration sensor 74 may be an acceleration sensor. In addition, instead of the vibration sensor 74, for example, a movement vector obtained by comparing captured images preceding and succeeding in time series, which are stored in the NVM 62 and/or the RAM 63, may be used as the vibration. In addition, the vibration finally used may be derived based on the vibration detected by the physical sensor and the movement vector obtained by image processing.

The feedback circuit 75 generates a feedback signal by performing various types of signal processing on the vibration detection signal input from the vibration sensor 74. The feedback circuit 75 is connected to the shake correction drive circuit 54 via the input/output I/F 59, and outputs the feedback signal to the shake correction drive circuit 54 in accordance with an instruction of the computer 60.

The display 76 is, for example, a liquid crystal display or an EL display, and displays an image and/or character information and the like. The display control circuit 77 causes the display 76 to display an image in accordance with an instruction of the computer 60.

The reception device 78 is, for example, a device such as a touch panel and/or a switch, and receives an instruction given by a user. The reception circuit 79 outputs a reception signal (not shown) in accordance with an instruction given to the reception device 78 by the user. The external I/F 80 is an interface that is communicably connected to an external device.

Figure 4:
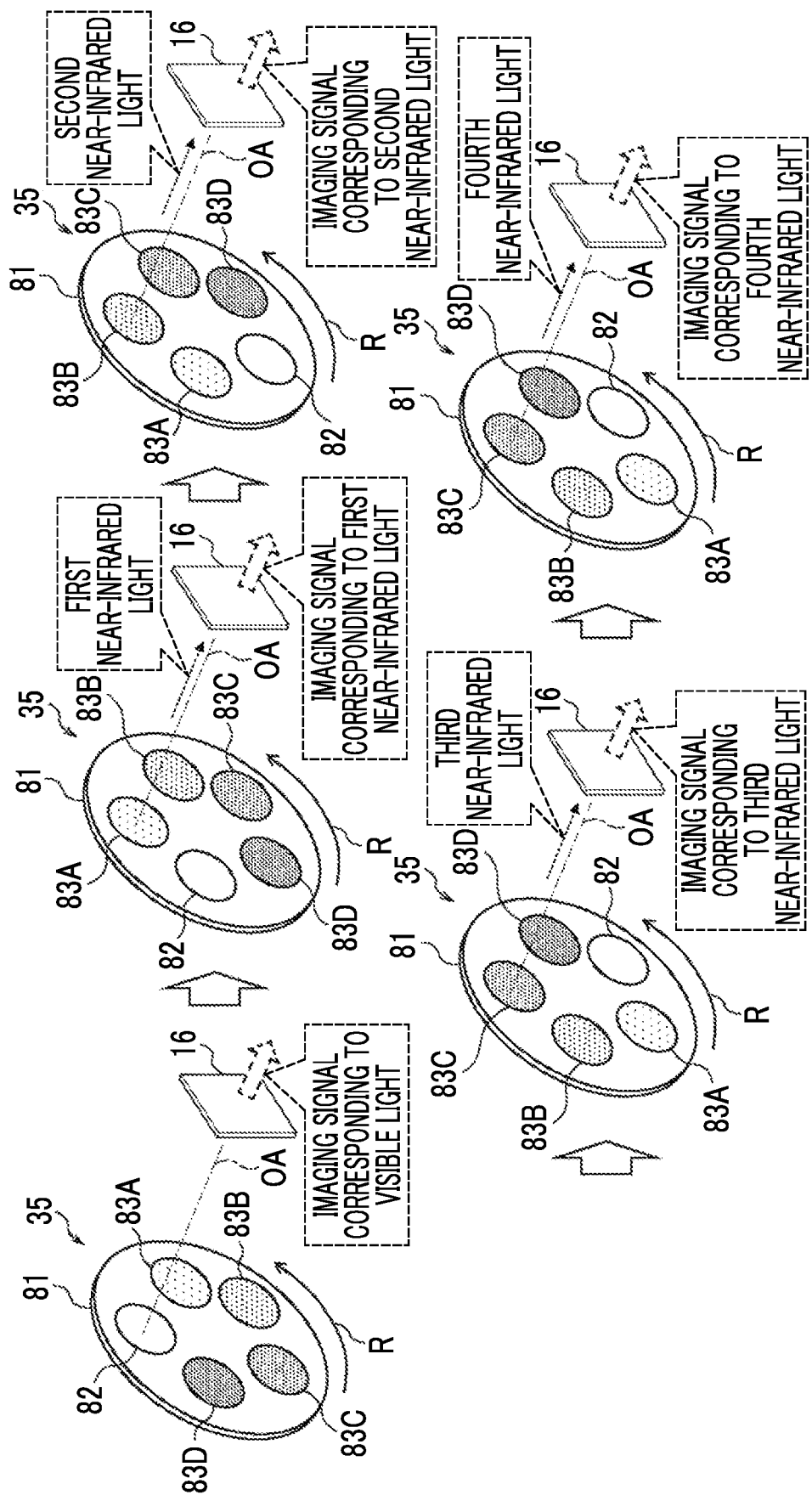
FIG. 4 is an explanatory diagram showing an example of a configuration and an operation of a turret filter according to the embodiment.

As an example, as shown in FIG. 4, the turret filter 35 comprises a disk 81. The disk 81 is provided with an Ir cut filter 82, a first BPF 83A, a second BPF 83B, a third BPF 83C, and a fourth BPF 83D, as a plurality of optical filters, at equal intervals along a circumferential direction of the disk 81. Hereinafter, the Ir cut filter 82, the first BPF 83A, the second BPF 83B, the third BPF 83C, and the fourth BPF 83D will be referred to as an optical filter, unless these need to be distinguished them from each other. In addition, in the following, the first BPF 83A, the second BPF 83B, the third BPF 83C, and the fourth BPF 83D will be referred to as a BPF 83, unless these need to be distinguished them from each other.

The turret filter 35 selectively inserts and removes the plurality of optical filters with respect to the optical path by a turret method. Specifically, the turret filter 35 rotates in an arc arrow R direction shown in FIG. 4, whereby the Ir cut filter 82, the first BPF 83A, the second BPF 83B, the third BPF 83C, and the fourth BPF 83D are selectively inserted into and removed from the optical path (for example, the optical path on the optical axis OA). In a case in which the optical filter is inserted into the optical path, the optical axis OA penetrates the center of the optical filter, and the center of the optical filter inserted into the optical path matches the center of the light-receiving surface of the photoelectric conversion element 16. The turret filter 35 selectively transmits light in different wavelength ranges among light incident on the turret filter 35 by the Ir cut filter 82, the first BPF 83A, the second BPF 83B, the third BPF 83C, and the fourth BPF 83D.

The Ir cut filter 82 is an optical filter that cuts infrared rays and transmits only light other than infrared rays. The BPF 83 is an optical filter that transmits near-infrared light. The first BPF 83A, the second BPF 83B, the third BPF 83C, and the fourth BPF 83D transmit near-infrared light in different wavelength ranges.

The first BPF 83A is an optical filter corresponding to a wavelength range in the vicinity of 1000 nm (nanometers). As an example, the first BPF 83A transmits only near-infrared light in a wavelength range of 950 nm to 1100 nm. Hereinafter, the near-infrared light transmitted through the first BPF 83A will be referred to as a first near-infrared light.

The second BPF 83B is an optical filter corresponding to a wavelength range in the vicinity of 1250 nm. As an example, the second BPF 83B transmits only near-infrared light in a wavelength range of 1150 nm to 1350 nm. Hereinafter, the near-infrared light transmitted through the second BPF 83B will be referred to as a second near-infrared light.

The third BPF 83C is an optical filter corresponding to a wavelength range in the vicinity of 1550 nm. As an example, the third BPF 83C transmits only near-infrared light in a wavelength range of 1500 nm to 1750 nm. Hereinafter, the near-infrared light transmitted through the third BPF 83C will be referred to as a third near-infrared light.

The fourth BPF 83D is an optical filter corresponding to a wavelength range in the vicinity of 2150 nm. As an example, the fourth BPF 83D transmits only near-infrared light in a wavelength range of 2000 nm to 2400 nm. Hereinafter, the near-infrared light transmitted through the fourth BPF 83D will be referred to as a fourth near-infrared light.

As described above, in the present embodiment, the visible light, the first near-infrared light, the second near-infrared light, the third near-infrared light, and the fourth near-infrared light are selectively transmitted through the turret filter 35, and the photoelectric conversion element 16 selectively receives the visible light, the first near-infrared light, the second near-infrared light, the third near-infrared light, and the fourth near-infrared light. Hereinafter, the first near-infrared light, the second near-infrared light, the third near-infrared light, and the fourth near-infrared light will be referred to as near-infrared light, unless these need to be distinguished them from each other. Each of the ranges described here includes an error generally allowed in the technical field, to which the technology of the present disclosure belongs, and an error within a range that does not depart from the gist of the technology of the present disclosure. In addition, each of the wavelength ranges described here is merely an example, and need only be a different wavelength range.

In a case in which the Ir cut filter 82 is inserted into the optical path, and the visible light transmitted through the Ir cut filter 82 is imaged on the light-receiving surface of the photoelectric conversion element 16, the photoelectric conversion element 16 outputs an imaging signal corresponding to the received visible light. Accordingly, a function of obtaining a visible light image by imaging the visible light is realized. In addition, in a case in which the BPF 83 is inserted into the optical path, and the near-infrared light transmitted through the BPF 83 is imaged on the light-receiving surface of the photoelectric conversion element 16, the photoelectric conversion element 16 outputs an imaging signal corresponding to the received near-infrared light. Accordingly, a function of obtaining a near-infrared light image by imaging the near-infrared light is realized.

Figure 5:
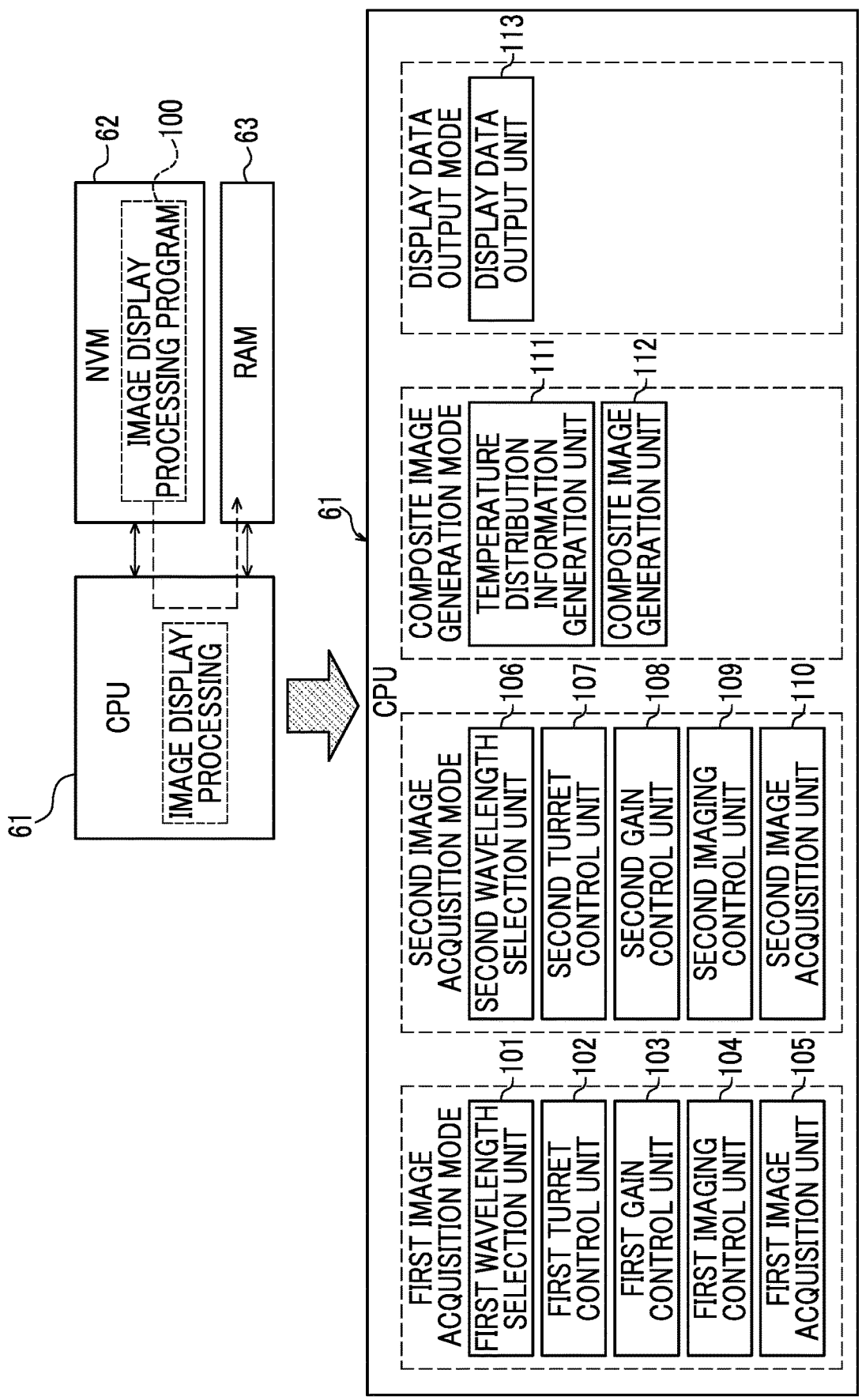
FIG. 5 is a block diagram showing an example of a functional configuration of a CPU according to the embodiment.

As an example, as shown in FIG. 5, an image display processing program 100 is stored in the NVM 62. The image display processing program 100 is an example of a "program" according to the technology of the present disclosure. The CPU 61 reads out the image display processing program 100 from the NVM 62 and executes the read-out image display processing program 100 on the RAM 63. The CPU 61 performs image display processing according to the image display processing program 100 executed on the RAM 63. In the image display processing, the CPU 61 has a first image acquisition mode, a second image acquisition mode, a composite image generation mode, and a display data output mode, as an operation mode. The operation mode is switched by the CPU 61 among the first image acquisition mode, the second image acquisition mode, the composite image generation mode, and the display data output mode. That is, the CPU 61 selectively sets the first image acquisition mode, the second image acquisition mode, the composite image generation mode, and the display data output mode. The first image acquisition mode is an example of a "first mode" according to the technology of the present disclosure, and the second image acquisition mode is an example of a "second mode" according to the technology of the present disclosure.

In the first image acquisition mode, the CPU 61 operates as a first wavelength selection unit 101, a first turret control unit 102, a first gain control unit 103, a first imaging control unit 104, and a first image acquisition unit 105. In addition, in the second image acquisition mode, the CPU 61 operates as a second wavelength selection unit 106, a second turret control unit 107, a second gain control unit 108, a second imaging control unit 109, and a second image acquisition unit 110. In addition, in the composite image generation mode, the CPU 61 operates as a temperature distribution information generation unit 111 and a composite image generation unit 112. In addition, in the display data output mode, the CPU 61 operates as a display data output unit 113.

Figure 6:
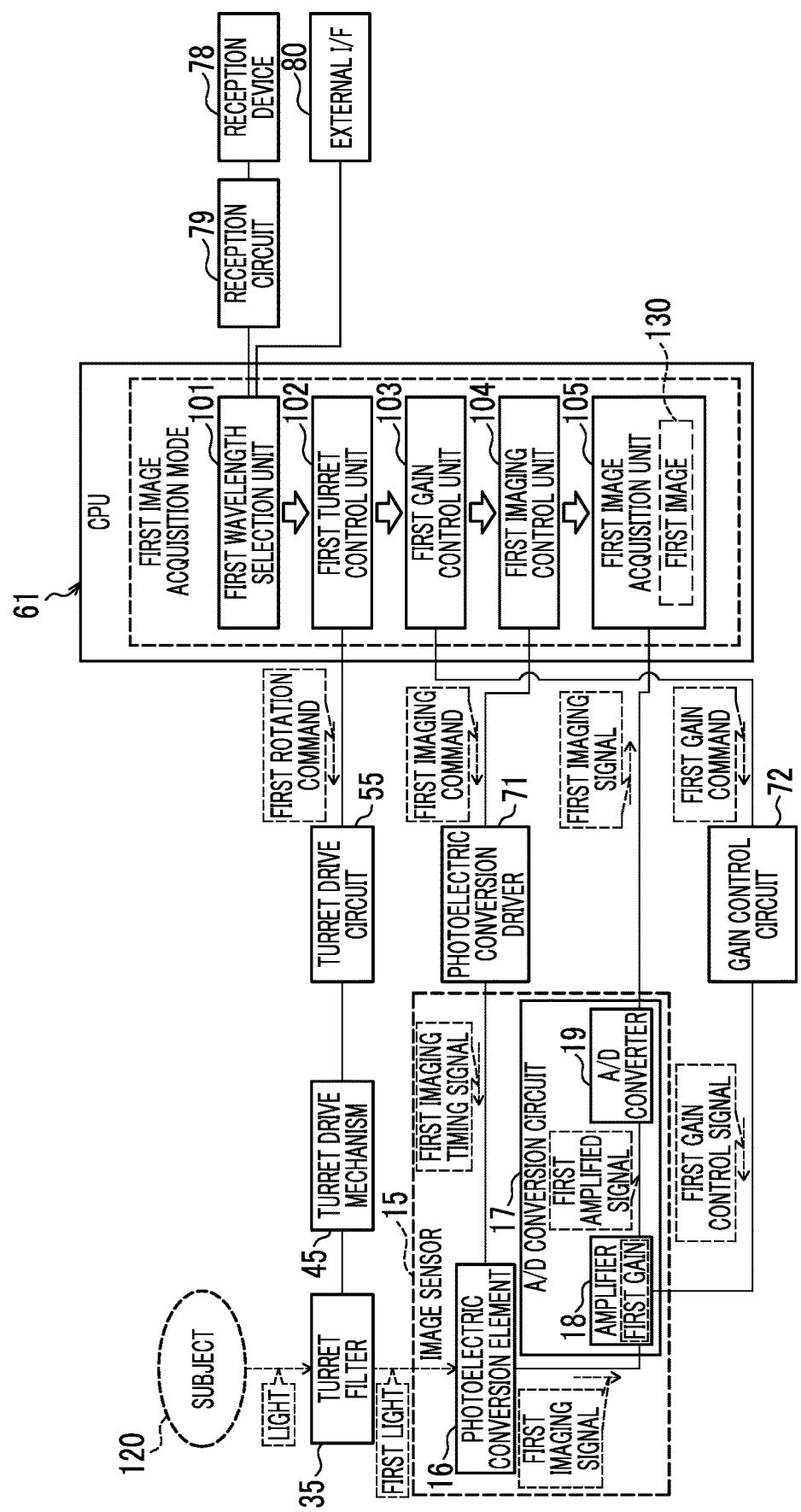
FIG. 6 is a block diagram showing an example of an operation of the CPU according to the embodiment in a first image acquisition mode.

First, the operation of the CPU 61 in the first image acquisition mode will be described. As an example, as shown in FIG. 6, the first wavelength selection unit 101 selects, for example, a first wavelength range to be used for the imaging in accordance with an instruction received by the reception device 78. As an example, the first wavelength selection unit 101 selects the first wavelength range from the wavelength range of the visible light, the wavelength range of the first near-infrared light from 950 nm to 1100 nm, the wavelength range of the second near-infrared light from 1150 nm to 1350 nm, the wavelength range of the third near-infrared light from 1500 nm to 1750 nm, and the wavelength range of the fourth near-infrared light from 2000 nm to 2400 nm. Here, a form example in which the first wavelength range is selected in accordance with an instruction received by the reception device 78 has been described, but the first wavelength range may be selected in accordance with various conditions (for example, a temperature of a subject 120 and/or an imaging condition), and the first wavelength range may be selected in accordance with an instruction received by the external I/F 80.

The first turret control unit 102 outputs, to the turret drive circuit 55, a first rotation command to insert an optical filter corresponding to the first wavelength range selected by the first wavelength selection unit 101 among the plurality of optical filters included in the turret filter 35, into the optical path. Upon receiving the first rotation command, the turret drive circuit 55 drives the turret drive mechanism 45 to rotate the turret filter 35 to a position where the optical filter corresponding to the first rotation command is inserted into the optical path. Accordingly, among the light emitted from the subject 120, first light transmitted through the optical filter inserted into the optical path is imaged on the light-receiving surface of the photoelectric conversion element 16. The first light is an example of a "first light" according to the technology of the present disclosure.

The first gain control unit 103 sets the gain of the amplifier 18 to a first gain via the gain control circuit 72. In this case, for example, the first gain control unit 103 outputs a first gain command to the gain control circuit 72. Upon receiving the first gain command, the gain control circuit 72 generates a first gain control signal. The first gain control signal is a signal for setting the gain of the amplifier 18 to the first gain. The gain control circuit 72 outputs the first gain control signal to the amplifier 18. Accordingly, the gain of the amplifier 18 is set to the first gain. The first gain may be a fixed value or a variable value. The first gain control unit 103 may change the first gain based on an instruction from an outside or information obtained from the subject 120. In addition, the information obtained from the subject 120 in this case may be information related to a type of the subject 120 and/or a temperature of the subject 120 or the like. In addition, the first gain control unit 103 may change the first gain according to, for example, an imaging condition. The first gain is an example of a "first sensitivity" according to the technology of the present disclosure.

The first imaging control unit 104 outputs a first imaging command to the photoelectric conversion driver 71. Upon receiving the first imaging command, the photoelectric conversion driver 71 outputs a first imaging timing signal (for example, a vertical synchronization signal and a horizontal synchronization signal) to the photoelectric conversion element 16. The photoelectric conversion element 16 images the first light in accordance with the first imaging timing signal, and outputs a first imaging signal obtained by imaging the first light. The amplifier 18 amplifies the first imaging signal with the first gain to generate a first amplified signal, and outputs the generated first amplified signal to the A/D converter 19. The A/D converter 19 converts the first amplified signal input from the amplifier 18 into a first image signal, and outputs the first image signal to the first image acquisition unit 105.

Figure 7:
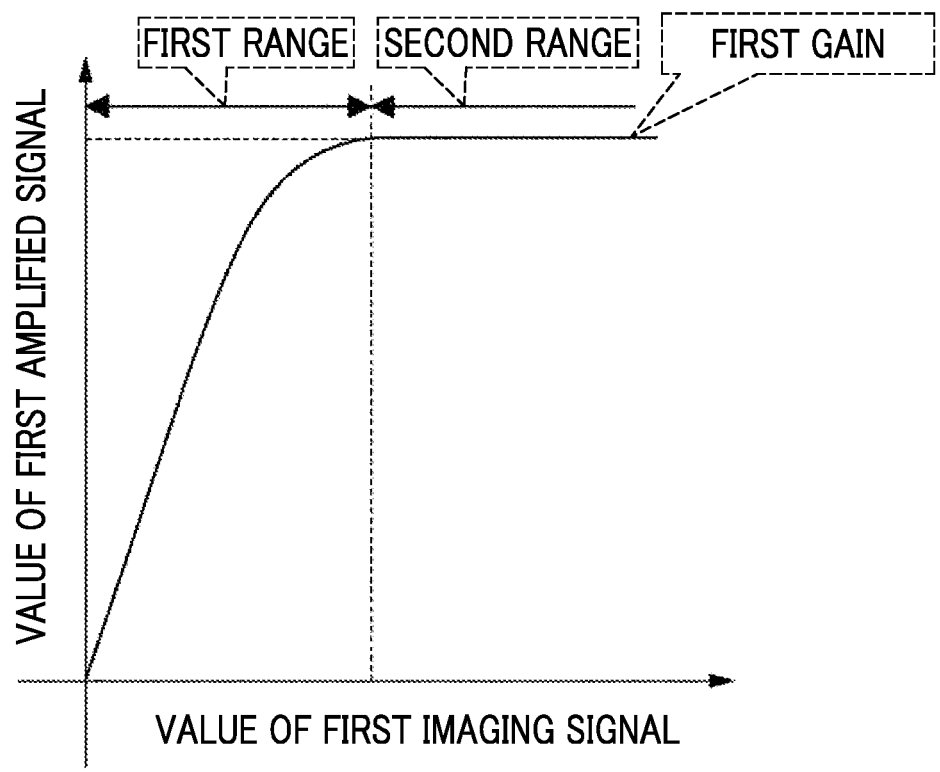
FIG. 7 is a graph showing a first gain according to the embodiment.

As an example, FIG. 7 is a graph showing an example of the first gain. As for the first gain, a relationship between a value of the first imaging signal and a value of the first amplified signal is defined by a curve. As an example, the first gain is set to a gain in which the value of the first amplified signal logarithmically increases as the value of the first imaging signal increases. That is, the signal amplification factor corresponding to the first gain is logarithmically defined.

As an example, as shown in FIG. 6, the first image acquisition unit 105 acquires a first image 130 based on the first image signal input from the A/D converter 19. The first image 130 is an image generated in frame units by the first image signal. That is, the first image acquisition unit 105 acquires the first image 130 by generating the first image 130 in frame units based on the first image signal. The first image 130 is an example of a "first image" according to the technology of the present disclosure.

Figure 8:
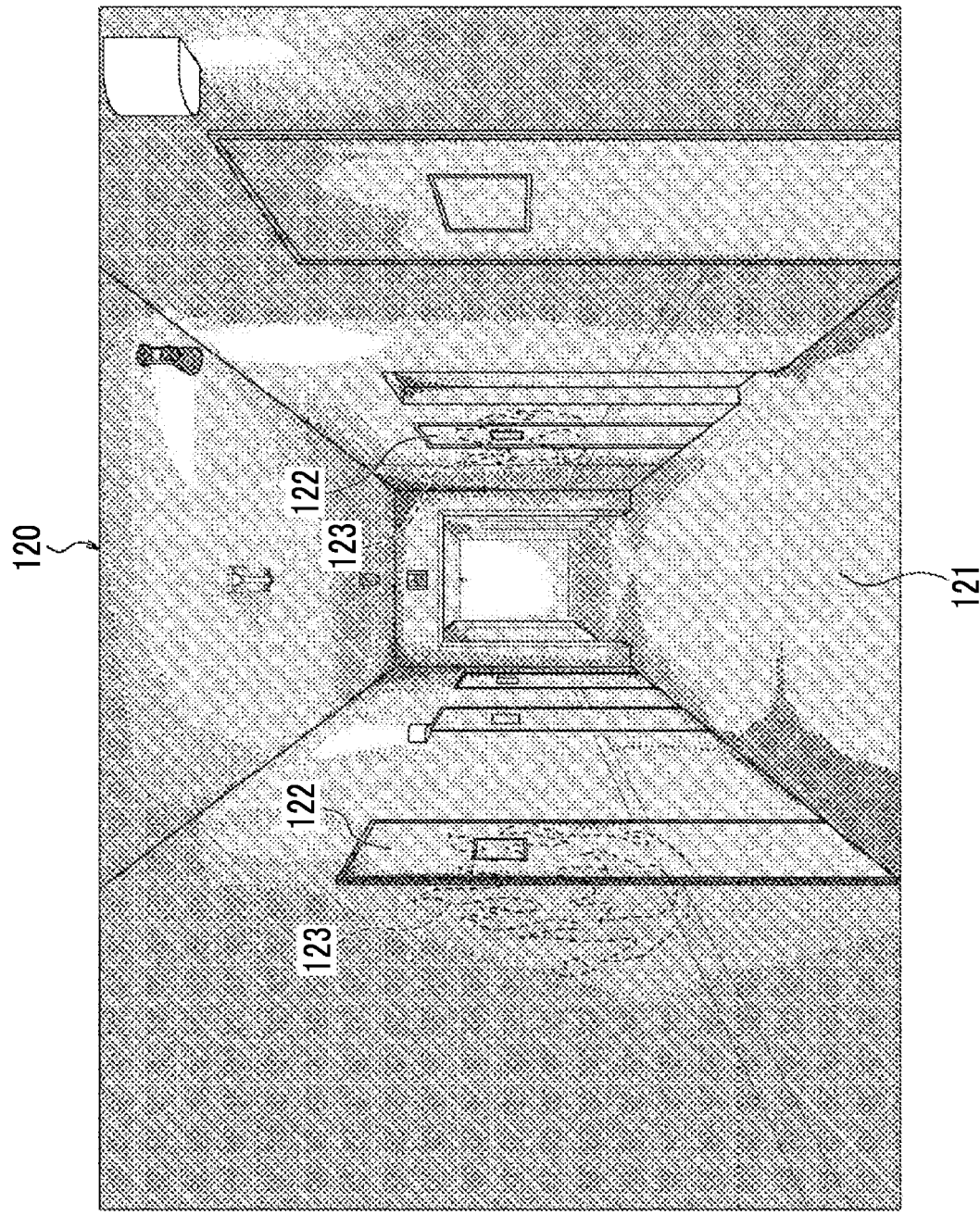
FIG. 8 is a diagram showing an example of a subject according to the embodiment.

As an example, FIG. 8 is a diagram showing an example of the subject 120. In the example shown in FIG. 8, the subject 120 is an interior of a building where a fire breaks out. Doors 122 are provided on both sides of a passage 121 provided in the interior of the building, and a flame 123 is present on an indoor side of each of the doors 122.

Figure 9:
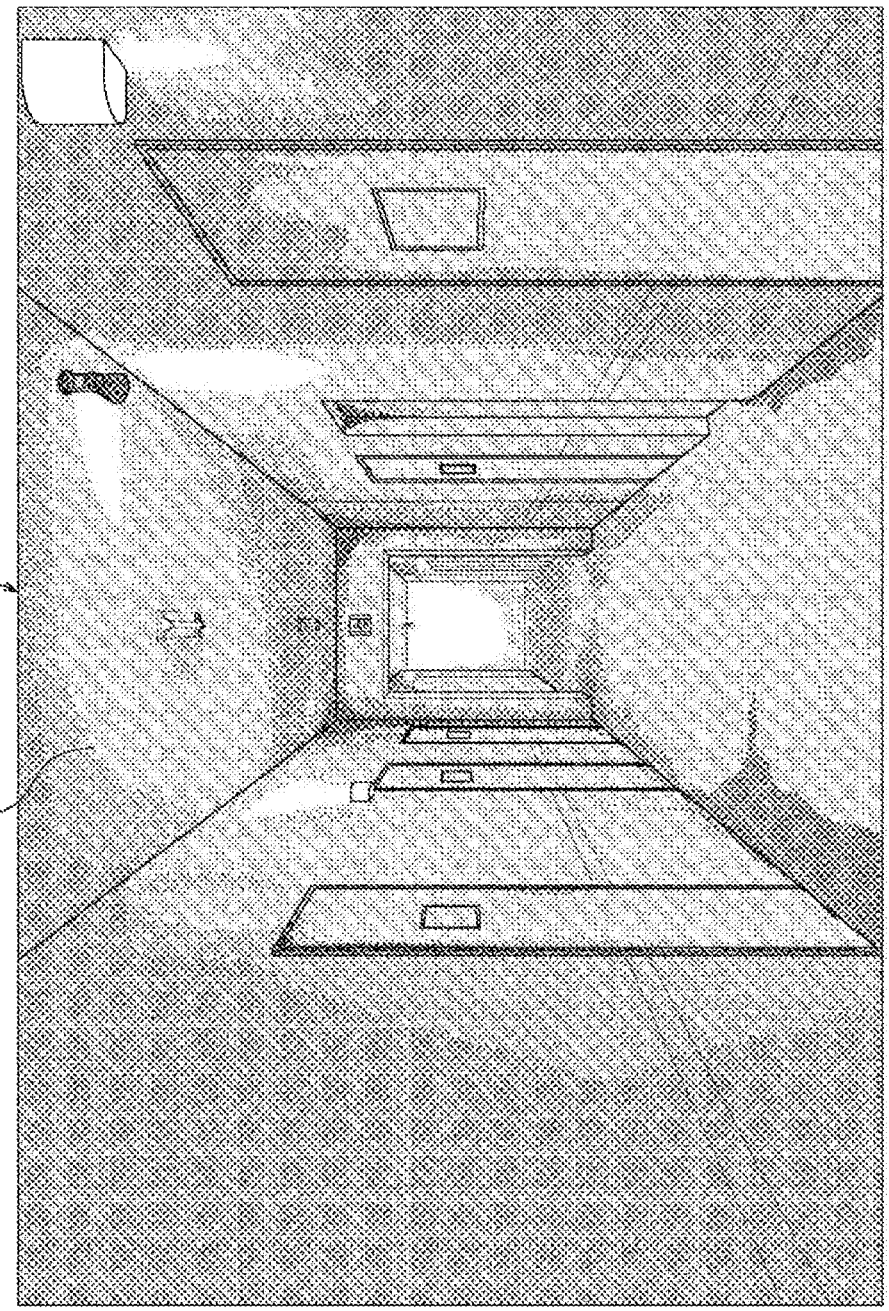
FIG. 9 is a diagram showing a first example of a first image obtained by imaging visible light as first light according to the embodiment.

As an example, FIG. 9 is a diagram showing a first example of the first image 130 obtained by imaging visible light as the first light. In the first image 130 according to the first example, shape information 131 of the subject 120 (see FIG. 8) is represented by a chromatic color (that is, a color) tone. The shape information 131 is information based on visible light reflected by the subject 120, and is information that represents a shape of the subject 120 by an image. As an example, the shape information 131 is information including contour information representing a contour of the subject 120. Specifically, the shape information 131 is information that represents the contour of the subject 120 and unevenness, ridgeline, and the like located inside the contour. It is needless to say that the shape information includes distance information such as a width or a depth of the subject 120.

Figure 10:
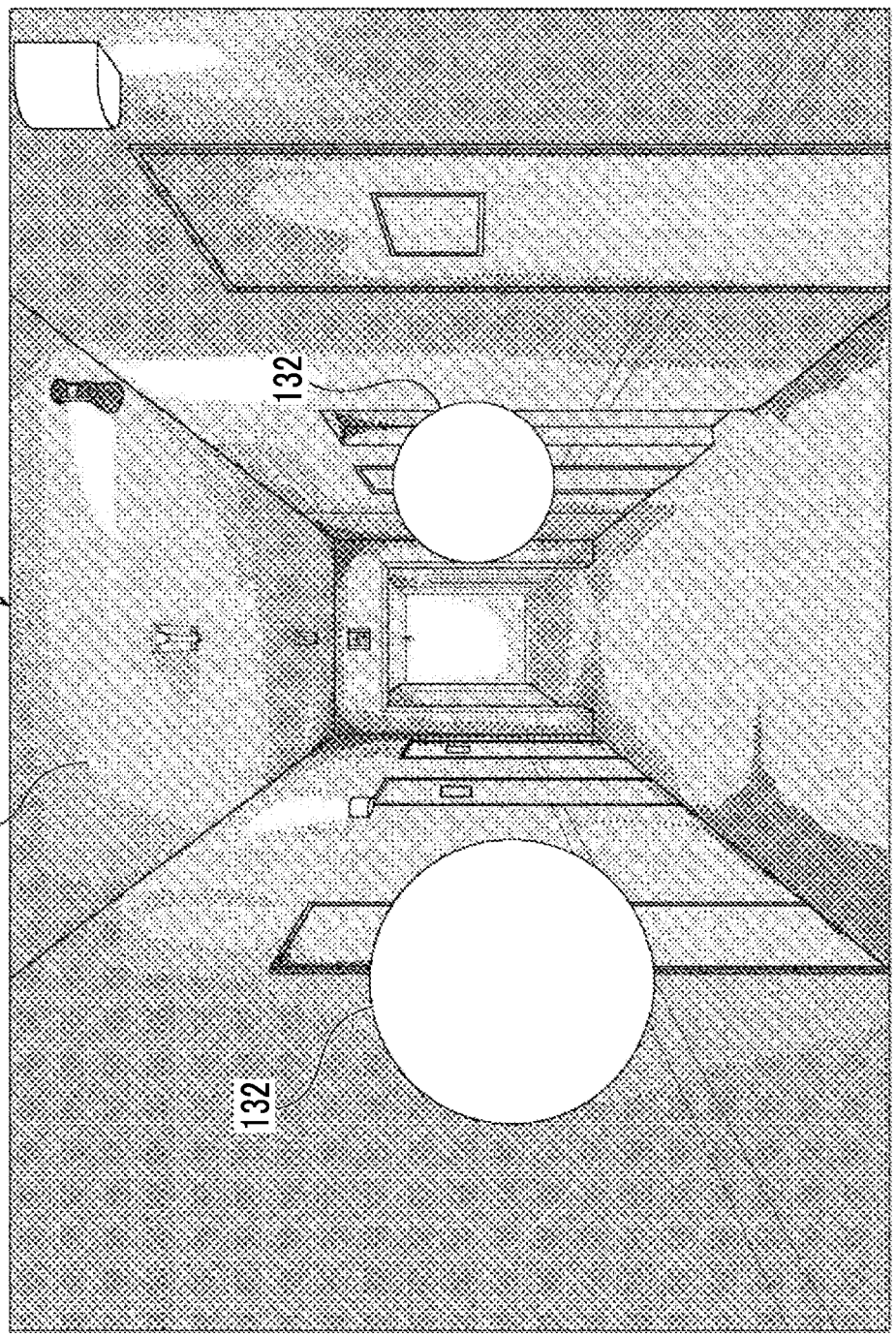
FIG. 10 is a diagram showing a second example of a first image obtained by imaging near-infrared light as the first light according to the embodiment.

As an example, FIG. 10 is a diagram showing a second example of the first image 130 obtained by imaging near-infrared light as the first light. In the first image 130 according to the second example, the shape information 131 and temperature information 132 of the subject (see FIG. 8) are represented by an achromatic color (that is, black and white) tone. The shape information 131 is information based on near-infrared light reflected by the subject 120, and is information that represents a shape of the subject 120 by an image. As an example, the shape information 131 includes contour information representing a contour of the subject 120. Specifically, the shape information 131 includes information representing the contour of the subject 120 and unevenness, ridgeline, and the like located inside the contour. The temperature information 132 is information based on near-infrared light included in an electromagnetic wave emitted from the subject 120 by thermal radiation, and is information representing the temperature of the subject 120 by an image. As an example, the temperature information 132 is information corresponding to the flame 123 (see FIG. 8).

Incidentally, the first image 130 according to the first example shown in FIG. 9 is a visible light image obtained by imaging visible light. Therefore, in the first image 130 according to the first example, the temperature information 132 (see FIG. 10) obtained by imaging the near-infrared light included in the electromagnetic wave emitted from the subject 120 by thermal radiation is not represented.

On the other hand, the first image 130 according to the second example shown in FIG. 10 is a near-infrared light image obtained by imaging near-infrared light. Therefore, in the first image 130 according to the second example, the shape information 131 and the temperature information 132 obtained by imaging the near-infrared light are simultaneously represented.

Here, the first image 130 according to the second example is an image obtained in a case in which the gain of the amplifier 18 (see FIG. 6) is set to the first gain. As an example, as shown in FIG. 7, the first gain is set to a gain in which the value of the first amplified signal logarithmically increases as the value of the first imaging signal increases.

In this example, for the near-infrared light reflected by the subject 120, the value of the first imaging signal is obtained in a first range, and, for the near-infrared light included in the electromagnetic wave emitted from the subject 120 by thermal radiation, the value of the first imaging signal is obtained in a second range (see FIG. 7). Therefore, in the first gain, for the near-infrared light reflected by the subject 120, the value of the first amplified signal increases as the value of the first imaging signal increases. Therefore, in the first image 130 according to the second example shown in FIG. 10, the shape information 131 is represented with a gradation. Hereinafter, in order to distinguish from a gradation of temperature information 142 of a second image 140 (see FIG. 13) described below, the gradation of the shape information 131 obtained by the first image 130 will be referred to as a first gradation. In this way, the first gain is set to a gain for representing the shape information 131 of the subject 120 with the first gradation in the first image 130.

However, in the first gain, for the near-infrared light included in the electromagnetic wave emitted from the subject 120 by thermal radiation, the value of the first amplified signal hardly increases even though the value of the first imaging signal increases. Therefore, in the first image 130 according to the second example shown in FIG. 10, the temperature information 132 is represented by a uniform tone (for example, a pure white tone).

Figure 13:
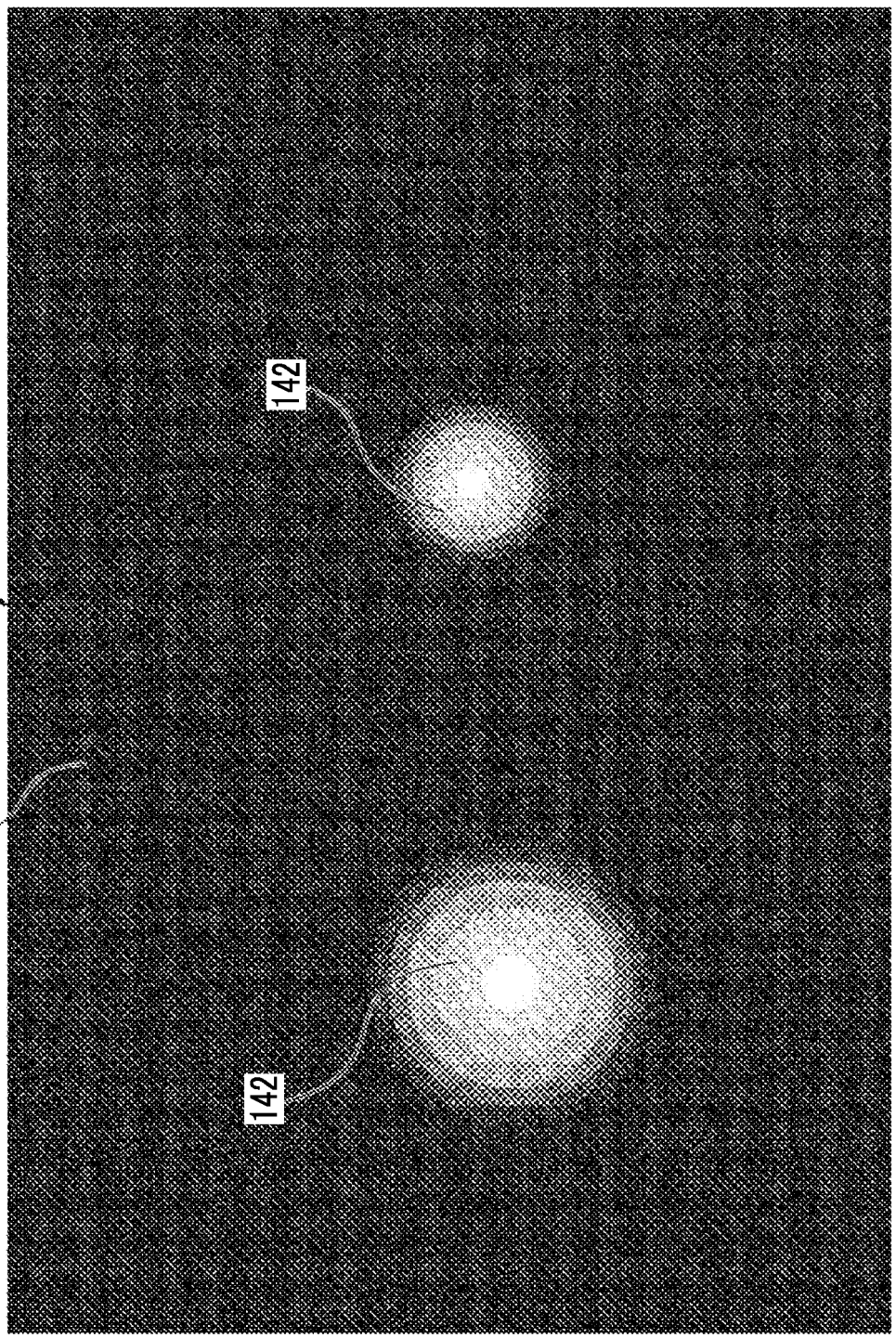
FIG. 13 is a diagram showing a second image obtained by imaging near-infrared light as second light according to the embodiment.

Therefore, the CPU 61 switches from the first image acquisition mode to the second image acquisition mode in order to obtain the temperature information 142 having a gradation (see FIG. 13).

Figure 11:
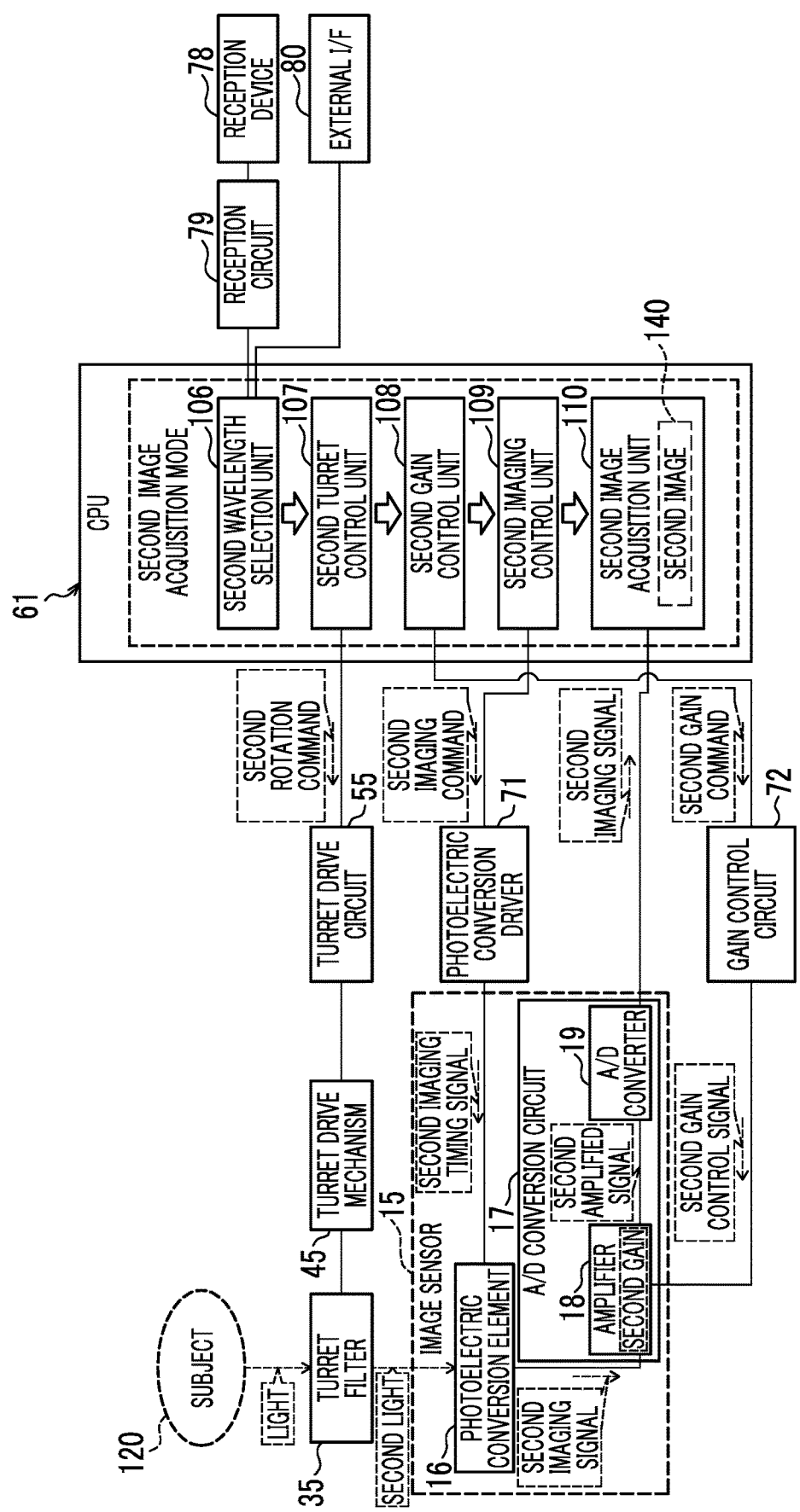
FIG. 11 is a block diagram showing an example of an operation of the CPU according to the embodiment in a second image acquisition mode.

Subsequently, the operation of the CPU 61 in the second image acquisition mode will be described. As an example, as shown in FIG. 11, the second wavelength selection unit 106 selects, for example, a second wavelength range to be used for the imaging in accordance with an instruction received by the reception device 78. As an example, the second wavelength selection unit 106 selects the second wavelength range from the wavelength range of the first near-infrared light from 950 nm to 1100 nm, the wavelength range of the second near-infrared light from 1150 nm to 1350 nm, the wavelength range of the third near-infrared light from 1500 nm to 1750 nm, and the wavelength range of the fourth near-infrared light from 2000 nm to 2400 nm. Here, a form example in which the second wavelength range is selected in accordance with an instruction received by the reception device 78 has been described, but the second wavelength range may be selected in accordance with various conditions (for example, a temperature of a subject 120 and/or an imaging condition), and the second wavelength range may be selected in accordance with an instruction received by the external I/F 80.

The second turret control unit 107 outputs, to the turret drive circuit 55, a second rotation command to insert the BPF 83 corresponding to the second wavelength range selected by the second wavelength selection unit 106 among a plurality of the BPFs 83 included in the turret filter 35, into the optical path. Upon receiving the second rotation command, the turret drive circuit 55 drives the turret drive mechanism 45 to rotate the turret filter 35 to a position where the BPF 83 corresponding to the second rotation command is inserted into the optical path. Accordingly, among the light emitted from the subject 120, second light transmitted through the BPF 83 inserted into the optical path is imaged on the light-receiving surface of the photoelectric conversion element 16. The second light is an example of a "second light" according to the technology of the present disclosure.

The second gain control unit 108 sets the gain of the amplifier 18 to a second gain via the gain control circuit 72. In this case, for example, the second gain control unit 108 outputs a second gain command to the gain control circuit 72. Upon receiving the second gain command, the gain control circuit 72 generates a second gain control signal. The second gain control signal is a signal for setting the gain of the amplifier 18 to the second gain. The gain control circuit 72 outputs the second gain control signal to the amplifier 18. Accordingly, the gain of the amplifier 18 is set to the second gain. The second gain may be a fixed value or a variable value. The second gain control unit 108 may change the second gain based on an instruction from an outside or information obtained from the subject 120. In addition, the information obtained from the subject 120 in this case may be information related to a type of the subject 120 and/or a temperature of the subject 120 or the like. In addition, the first gain control unit 103 may change the first gain according to, for example, an imaging condition. The second gain is an example of a "second sensitivity" according to the technology of the present disclosure.

The second imaging control unit 109 outputs a second imaging command to the photoelectric conversion driver 71. Upon receiving the second imaging command, the photoelectric conversion driver 71 outputs a second imaging timing signal (for example, a vertical synchronization signal and a horizontal synchronization signal) to the photoelectric conversion element 16. The photoelectric conversion element 16 images the second light in accordance with the second imaging timing signal, and outputs a second imaging signal obtained by imaging the second light. The amplifier 18 amplifies the second imaging signal with the second gain to generate a second amplified signal, and outputs the generated second amplified signal to the A/D converter 19. The A/D converter 19 converts the second amplified signal input from the amplifier 18 into a second image signal, and outputs the second image signal to the second image acquisition unit 110.

Figure 12:
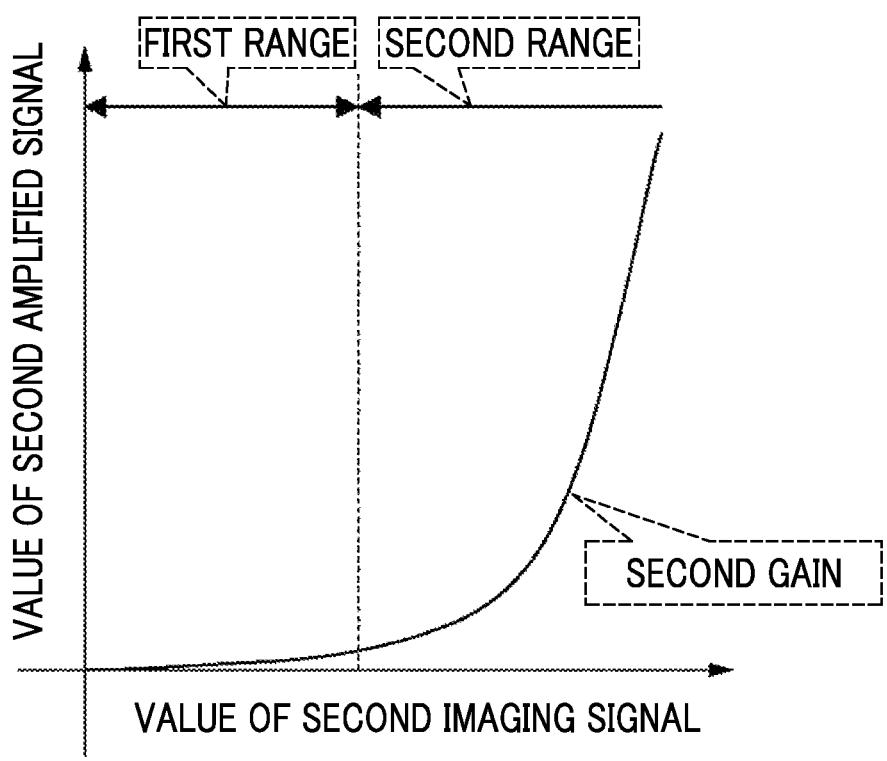
FIG. 12 is a graph showing a second gain according to the embodiment.

As an example, FIG. 12 is a graph showing an example of the second gain. As for the second gain, a relationship between a value of the second imaging signal and a value of the second amplified signal is defined by a curve. As an example, the second gain is set to a gain in which the value of the second amplified signal logarithmically increases as the value of the second imaging signal increases. That is, the signal amplification factor corresponding to the second gain is exponentially defined. In a case in which the first gain and the second gain are compared, the first gain is higher than the second gain.

As an example, as shown in FIG. 11, the second image acquisition unit 110 acquires a second image 140 based on the second image signal input from the A/D converter 19. The second image 140 is an image generated in frame units by the second image signal. That is, the second image acquisition unit 110 acquires the second image 140 by generating the second image 140 in frame units based on the second image signal. The second image 140 is an example of a "second image" according to the technology of the present disclosure.

As an example, FIG. 13 is a diagram showing an example of the second image 140 obtained by imaging the second light which is near-infrared light. The second image 140 is an image obtained in a case in which the gain of the amplifier 18 (see FIG. 11) is set to the second gain.

As described above, in this example, for the near-infrared light reflected by the subject 120, the value of the first imaging signal is obtained in a first range, and, for the near-infrared light included in the electromagnetic wave emitted from the subject 120 by thermal radiation, the value of the first imaging signal is obtained in a second range (see FIG. 12). Therefore, in the second gain, for the near-infrared light included in the electromagnetic wave emitted from the subject 120 by thermal radiation, the value of the second amplified signal increases as the value of the second imaging signal increases. Therefore, in the second image 140 shown in FIG. 13, the temperature information 142 is represented with a gradation. Hereinafter, in order to distinguish from the first gradation of the shape information 131 of the first image 130 (see FIGS. 9 and 10) described above, the gradation of the temperature information 142 obtained by the second image 140 will be referred to as a second gradation. In this way, the second gain is set to a gain for representing the temperature information 142 of the subject 120 with the second gradation in the second image 140.

Note that the temperature information 142 is represented by a gradation of an achromatic color (that is, black and white). That is, the temperature information 142 is represented by a color that is closer to white for a region with a higher temperature and is represented by a color that is closer to black for a region with a lower temperature. In addition, in the second gain, for the near-infrared light reflected by the subject 120, the value of the first amplified signal hardly increases even though the value of the second imaging signal increases. Therefore, in the second image 140 shown in FIG. 13, the shape information 141 is represented by a uniform tone (for example, a pitch black tone).

Therefore, the CPU 61 switches the second image acquisition mode to the composite image generation mode in order to obtain a composite image 150 (see FIG. 16) including the shape information 131 having a gradation and temperature distribution information 143 having a chromatic color (that is, color) gradation.

Figure 14:
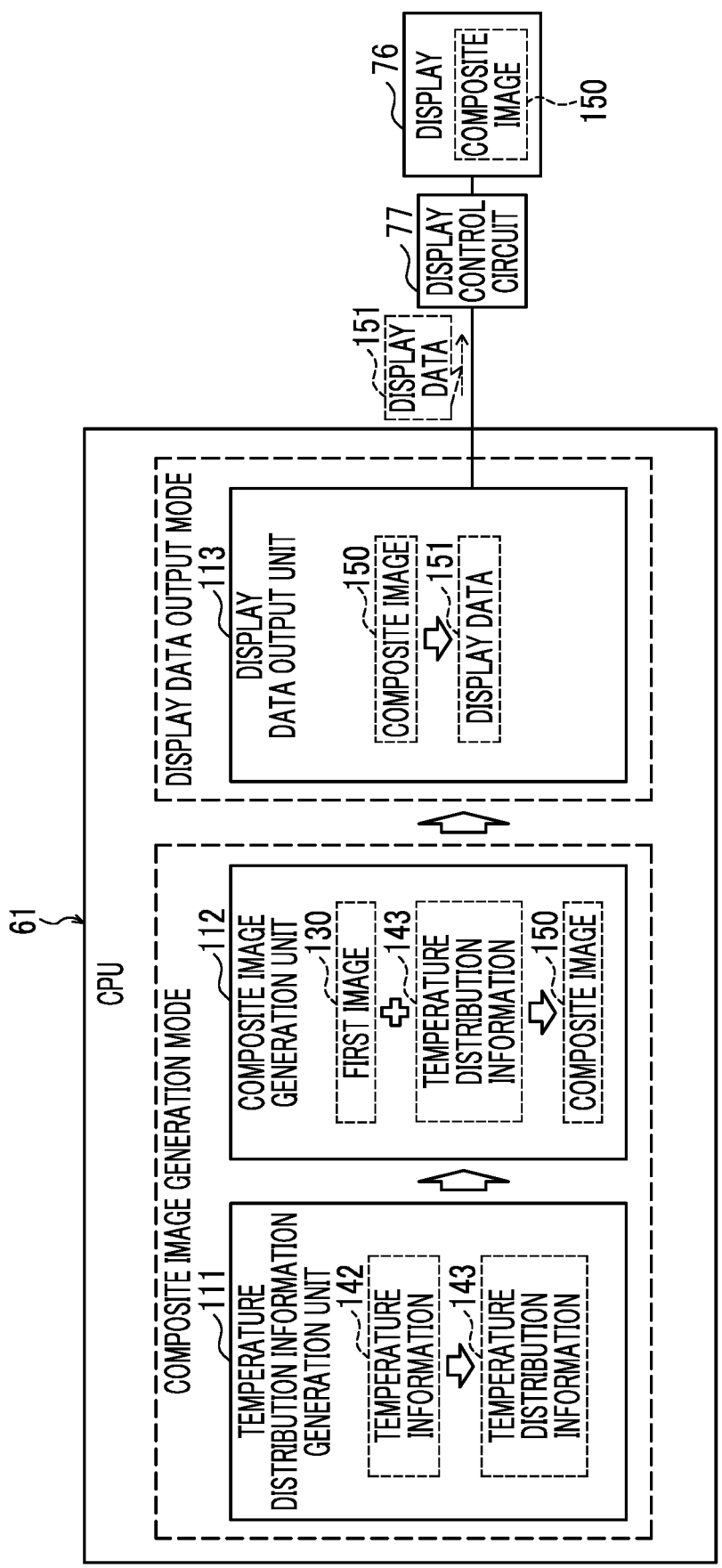
FIG. 14 is a block diagram showing an example of an operation of the CPU according to the embodiment in a composite image generation mode and in a display data output mode.
Figure 15:
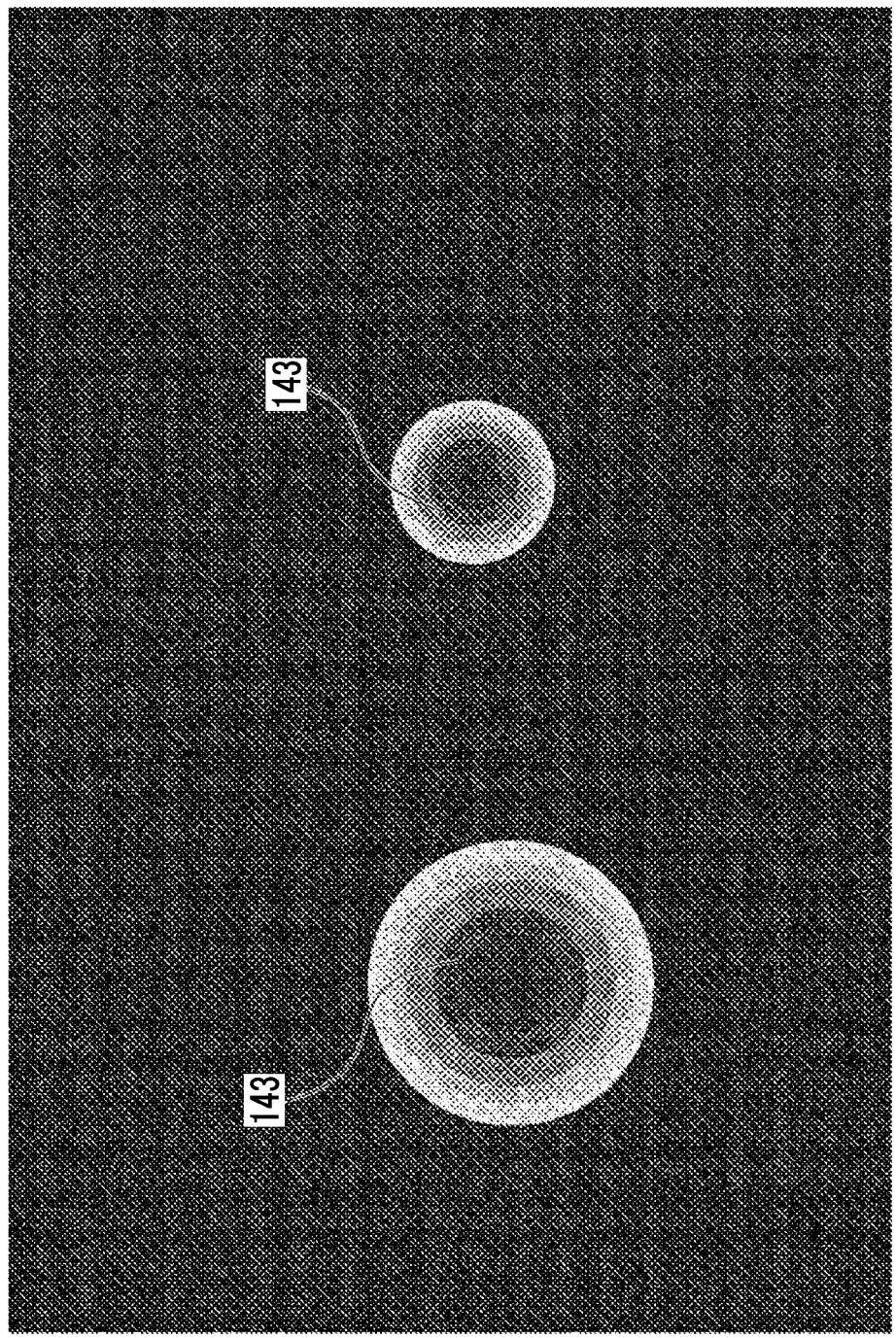
FIG. 15 is a diagram showing an example of temperature distribution information according to the embodiment.

Subsequently, the operation of the CPU 61 in the composite image generation mode will be described. As an example, as shown in FIG. 14, the temperature distribution information generation unit 111 generates the temperature distribution information 143 based on the temperature information 142. As an example, as shown in FIG. 15, the temperature distribution information 143 is information representing a temperature distribution with a visual feature amount. The temperature distribution information 143 is represented by an image. As an example, the temperature distribution information generation unit 111 generates the temperature distribution information 143 represented by a color shade from the temperature information 142 represented by a black and white shade (see FIG. 13). As an example, the temperature distribution information 143 is represented within a certain hue angle (here, as an example, a hue angle of 0 degrees or more and 240 degrees or less). In this case, for example, the temperature distribution information 143 is represented by a color that is closer to red for a region with a higher temperature and is represented by a color that is closer to blue for a region with a lower temperature. The temperature distribution information 143 is an example of "temperature distribution information" according to the technology of the present disclosure.

The temperature distribution information 143 may be represented by a numerical value, an contour line, or the like, in addition to being represented by a color shade. In addition, the temperature distribution information 143 may be of any form as long as the information represents the temperature distribution with a visual feature amount. In addition, the temperature distribution information 143 may be a non-transparent image or a translucent image.

Figure 16:
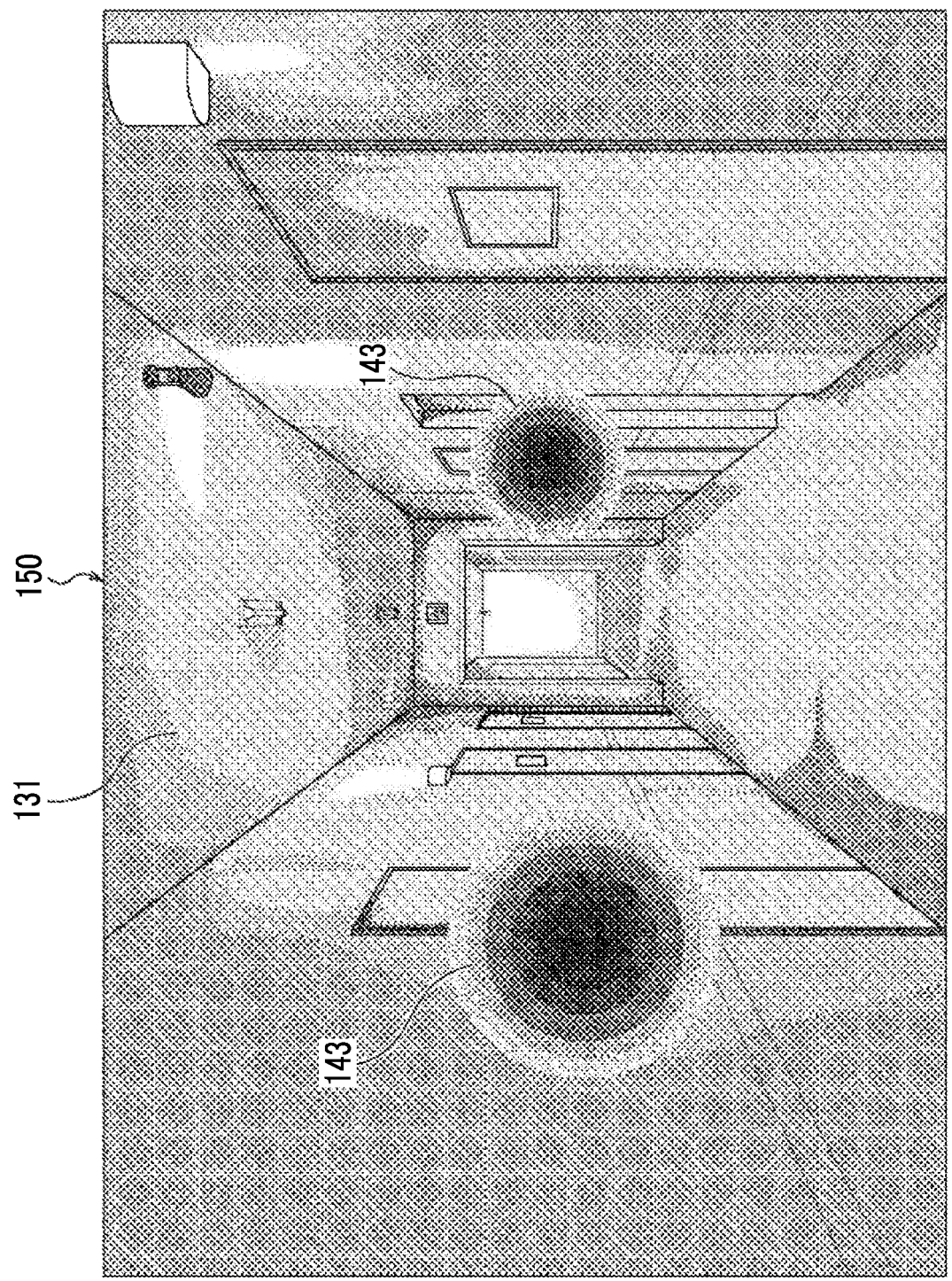
FIG. 16 is a diagram showing an example of a composite image according to the embodiment.

The composite image generation unit 112 generates the composite image 150 based on the first image 130 acquired by the first image acquisition unit 105 (see FIG. 6) and the temperature distribution information 143 generated by the temperature distribution information generation unit 111. As an example, as shown in FIG. 16, the composite image 150 is an image representing the shape information 131 and the temperature distribution information 143. More specifically, the composite image 150 is an image in which the temperature distribution information 143 is superimposed on the first image 130. Although the composite image 150 shown in FIG. 16 is an image in which the temperature distribution information 143 is superimposed on the first image 130, which is the near-infrared light image shown in FIG. 10, the composite image 150 may be an image in which the temperature distribution information 143 is superimposed on the first image 130, which is the visible light image shown in FIG. 9. The composite image 150 is an image for one frame displayed on the display 76. The composite image 150 is an example of a "composite image" according to the technology of the present disclosure.

The composite image generation unit 112 may generate the composite image 150 by superimposing the temperature information 142 included in the second image 140 acquired by the second image acquisition unit 110 (see FIG. 11) on the first image 130 acquired by the first image acquisition unit 105 (see FIG. 6). In addition, the composite image 150 may be an image in which the second image 140, the temperature information 142, or the temperature distribution information 143 is embedded in the first image 130.

Subsequently, the CPU 61 switches the composite image generation mode to the display data output mode. As an example, as shown in FIG. 14, the display data output unit 113 generates display data 151 for displaying the composite image 150 on the display 76. Then, the display data output unit 113 outputs the display data 151 to the display control circuit 77. The display control circuit 77 causes the display 76 to display the composite image 150 according to the display data 151 input from the display data output unit 113.

Figure 17:
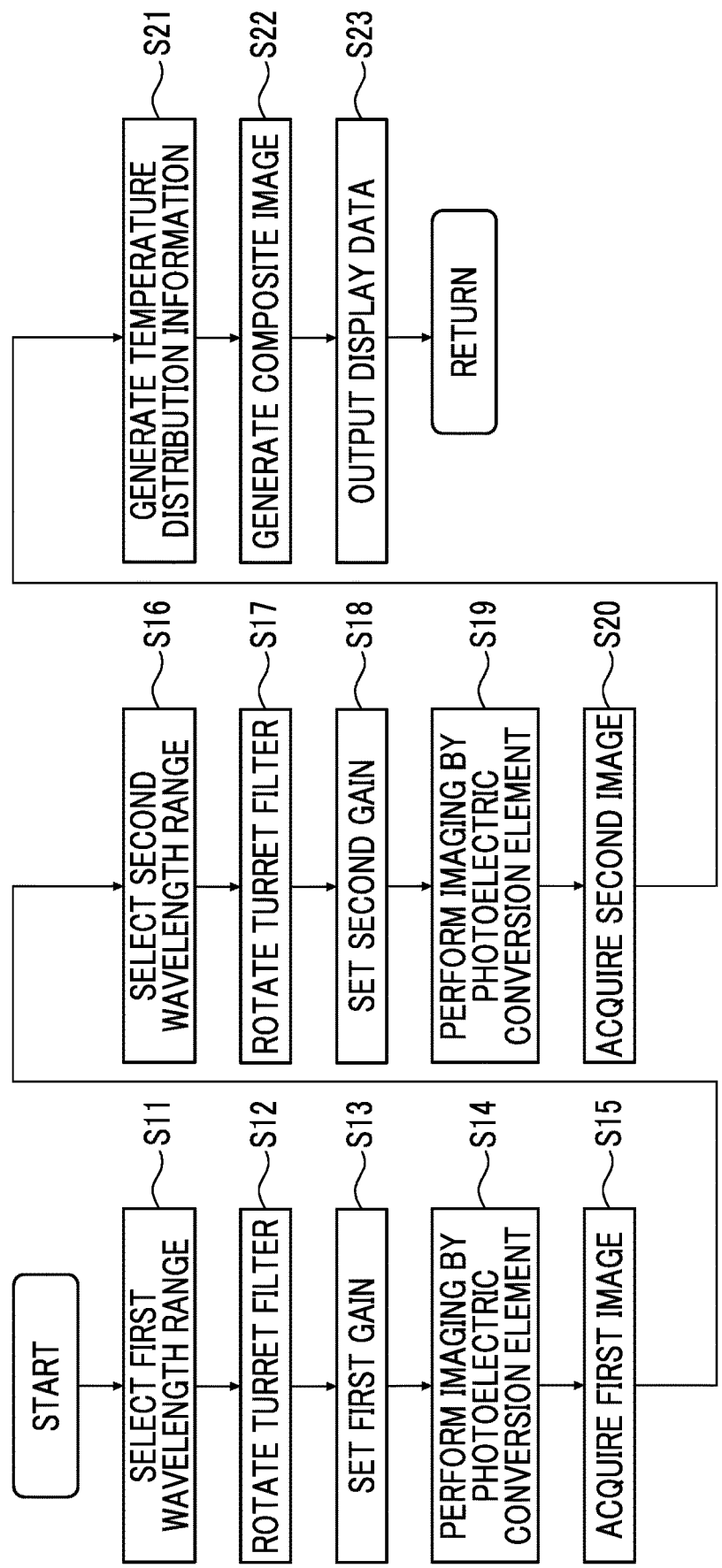
FIG. 17 is a flowchart showing an example of a flow of image display processing executed by the CPU according to the embodiment.

Next, an action of the camera 1 according to the present embodiment will be described with reference to FIG. 17. FIG. 17 shows an example of a flow of the image display processing according to the present embodiment.

In the image display processing shown in FIG. 17, first, in step S11, the first wavelength selection unit 101 selects the first wavelength range to be used for the imaging.

In step S12, the first turret control unit 102 rotates the turret filter 35 to a position where an optical filter corresponding to the first wavelength range selected by the first wavelength selection unit 101 among the plurality of optical filters is inserted into the optical path.

In step S13, the first gain control unit 103 sets the gain of the amplifier 18 to the first gain.

In step S14, the first imaging control unit 104 causes the photoelectric conversion element 16 to perform imaging.

In step S15, the first image acquisition unit 105 acquires the first image 130 based on the first image signal obtained by the imaging of the photoelectric conversion element 16.

In step S16, the second wavelength selection unit 106 selects the second wavelength range to be used for the imaging.

In step S17, the second turret control unit 107 rotates the turret filter 35 to a position where the BPF 83 corresponding to the second wavelength range selected by the second wavelength selection unit 106 among the plurality of BPFs 83 is inserted into the optical path.

In step S18, the second gain control unit 108 sets the gain of the amplifier 18 to the second gain.

In step S19, the second imaging control unit 109 causes the photoelectric conversion element 16 to perform imaging.

In step S20, the second image acquisition unit 110 acquires the second image 140 based on the second image signal obtained by the imaging of the photoelectric conversion element 16.

In step S21, the temperature distribution information generation unit 111 generates the temperature distribution information 143 based on the temperature information 142 included in the second image 140.

In step S22, the composite image generation unit 112 generates the composite image 150 based on the first image 130 and the temperature distribution information 143.

In step S23, the display data output unit 113 outputs the display data 151 for displaying the composite image 150 on the display 76. Accordingly, the composite image 150 is displayed on the display 76.

Here, a form example in which the composite image 150 is displayed on the display 76 has been described, but the technology of the present disclosure is not limited to this. For example, the first image 130, the second image 140, the temperature information 142, or the temperature distribution information 143 may be alternately displayed at a predetermined frame rate or higher. Here, the predetermined frame rate refers to a frame rate (for example, 60 frames/second) at which visual illusion is caused as though the first image 130, the second image 140, the temperature information 142, or the temperature distribution information 143 is superimposed.

The process shown in FIG. 17 returns to step S11 after step S23. Then, in the process shown in FIG. 17, steps S11 to S23 are repeatedly executed until the process is stopped due to an instruction from the user and/or an instruction from the outside. The imaging control method described as the action of the camera 1 is an example of an "imaging control method" according to the technology of the present disclosure.

As described above, in the camera 1 according to the present embodiment, the CPU 61 acquires the first image 130 by causing the image sensor 15 to image the first light with the first gain, and acquires the second image 140 by causing the image sensor 15 to image the second light with the second gain. The first gain is a gain for representing the shape information 131 of the subject 120 with the first gradation in the first image 130, and the second gain is a gain for representing the temperature information 142 of the subject 120 with the second gradation in the second image 140. Therefore, it is possible to acquire the first image 130 in which the shape information 131 of the subject 120 is represented with the first gradation, and the second image 140 in which the temperature information 142 of the subject 120 is represented with the second gradation.

In addition, the shape information 131 includes contour information representing a contour of the subject 120. Therefore, the first image 130 can include the contour information representing the contour of the subject 120.

In addition, the CPU 61 generates the composite image 150 based on the first image 130 and the second image 140. Therefore, the composite image 150 based on the first image 130 and the second image 140 can be obtained.

In addition, the CPU 61 generates the temperature distribution information 143 corresponding to the temperature information 142, and the composite image 150 is an image representing the shape information 131 and the temperature distribution information 143. Therefore, the shape and temperature distribution of the subject 120 can be grasped based on the composite image 150.

In addition, the composite image 150 is an image in which the temperature distribution information 143 is superimposed on the first image 130. Therefore, the temperature distribution of the subject 120 can be grasped on the first image 130.

In addition, the temperature distribution information 143 is information representing a temperature distribution with a visual feature amount. Therefore, the temperature distribution of the subject 120 can be grasped with a visual feature amount based on the temperature distribution information 143.

In addition, the temperature distribution information 143 may be a translucent image. In this case, the shape information 131 that overlaps with the temperature distribution information 143 can be grasped.

The CPU 61 outputs the display data 151 for displaying the composite image 150 on the display 76. Accordingly, the composite image 150 can be displayed on the display 76.

In addition, the first gain and the second gain are defined based on the signal amplification factor of the imaging signal obtained by the imaging of the image sensor 15. Therefore, the gain of the image sensor 15 can be changed by changing the signal amplification factor.

In addition, the image sensor 15 includes the photoelectric conversion element 16 that selectively receives the first light and the second light and that outputs the imaging signal, and the amplifier 18 that amplifies the imaging signal and outputs the amplified signal. As for the signal amplification factor, a relationship between the imaging signal and the amplified signal is defined by a curve. Therefore, by varying the signal amplification factor, it is possible to set the first gain for representing the shape information 131 of the subject 120 with the first gradation in the first image 130 and the second gain for representing the temperature information 142 of the subject 120 with the second gradation in the second image 140.

The first gain is higher than the second gain. Therefore, the gain of the image sensor 15 can be varied between the first gain for representing the shape information 131 of the subject 120 with the first gradation in the first image 130 and the second gain for representing the temperature information 142 of the subject 120 with the second gradation in the second image 140.

The CPU 61 may change at least one of the first gain or the second gain based on an instruction from the outside or information obtained from the subject 120. In this case, at least one of the first gain or the second gain can be set to a gain corresponding to an instruction from the outside or information obtained from the subject 120.

In addition, the first light and the second light may be near-infrared light. In this case, each of the first image 130 and the second image 140 can be obtained as a near-infrared light image obtained by imaging near-infrared light.

Figure 18:
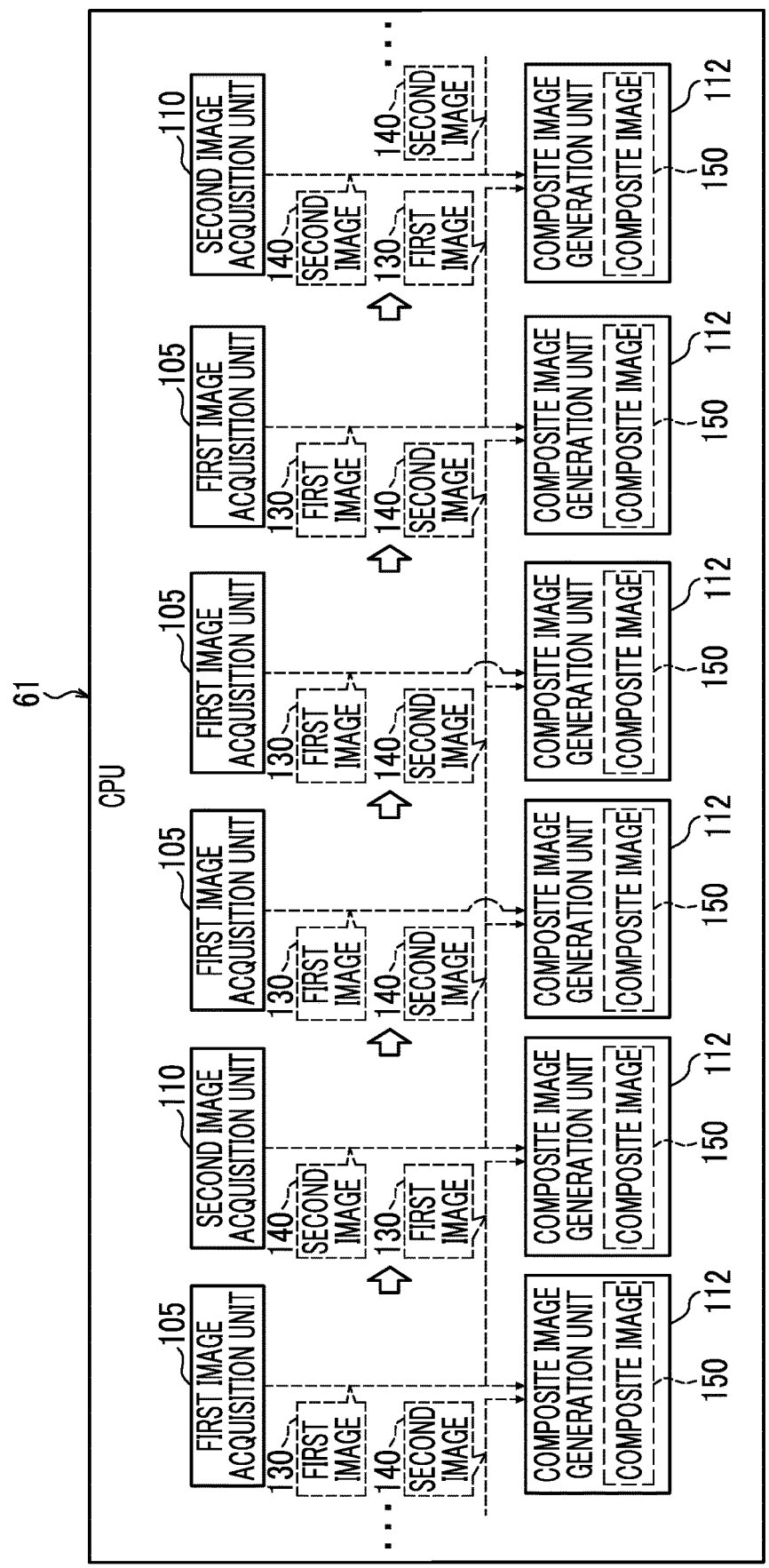
FIG. 18 is a diagram showing an example of a modification example of the image display processing executed by the CPU according to the embodiment.

As an example, as shown in FIG. 18, the CPU 61 may set a first frequency of acquiring the first image 130 by the first image acquisition unit 105 higher than a second frequency of acquiring the second image 140 by the second image acquisition unit 110. In addition, the composite image generation unit 112 may generate the composite image 150 by combining the second image 140 acquired by the second image acquisition unit 110 with the first image 130 each time the first image 130 is acquired by the first image acquisition unit 105. The second frequency may be set to, for example, a frequency of once per second. In the example shown in FIG. 18, the first frequency is set to 3 in a case in which the second frequency is 1. In a case in which the first frequency is set higher than the second frequency in this way, a frequency with which the first image 130 included in the composite image 150 is updated can be set higher than, for example, in a case in which the first frequency and the second frequency are set to be the same.

In addition, the CPU 61 may set the sensitivity of the image sensor 15 to the first sensitivity and the second sensitivity by changing the amount of light received by the image sensor 15 by the stop 33 and the stop drive mechanism 43. That is, in the above-described embodiment, the sensitivity of the image sensor 15 is defined based on the gain of the amplifier 18, that is, the signal amplification factor of the imaging signal obtained by the imaging of the image sensor 15, but the first sensitivity and the second sensitivity may be defined based on the change in amount of light received by the image sensor 15. The stop 33 and the stop drive mechanism 43 are examples of a "stop mechanism" according to the technology of the present disclosure.

In the above-described embodiment, a lens-interchangeable digital camera is exemplified as the camera 1, but this is merely an example, and a digital camera with a fixed lens may be used or a digital camera, which is built in various electronic apparatuses such as a smart device, a wearable terminal, a cell observation device, an ophthalmologic observation device, or a surgical microscope, may be used. In addition, the camera 1 may be a glasses-type eyewear terminal or a head-mounted display terminal worn on a head. In the eyewear terminal or the head-mounted display terminal, the display 76 may be provided only for one eye or may be provided for both eyes. In addition, the display 76 may be formed to be translucent.

Figure 19:
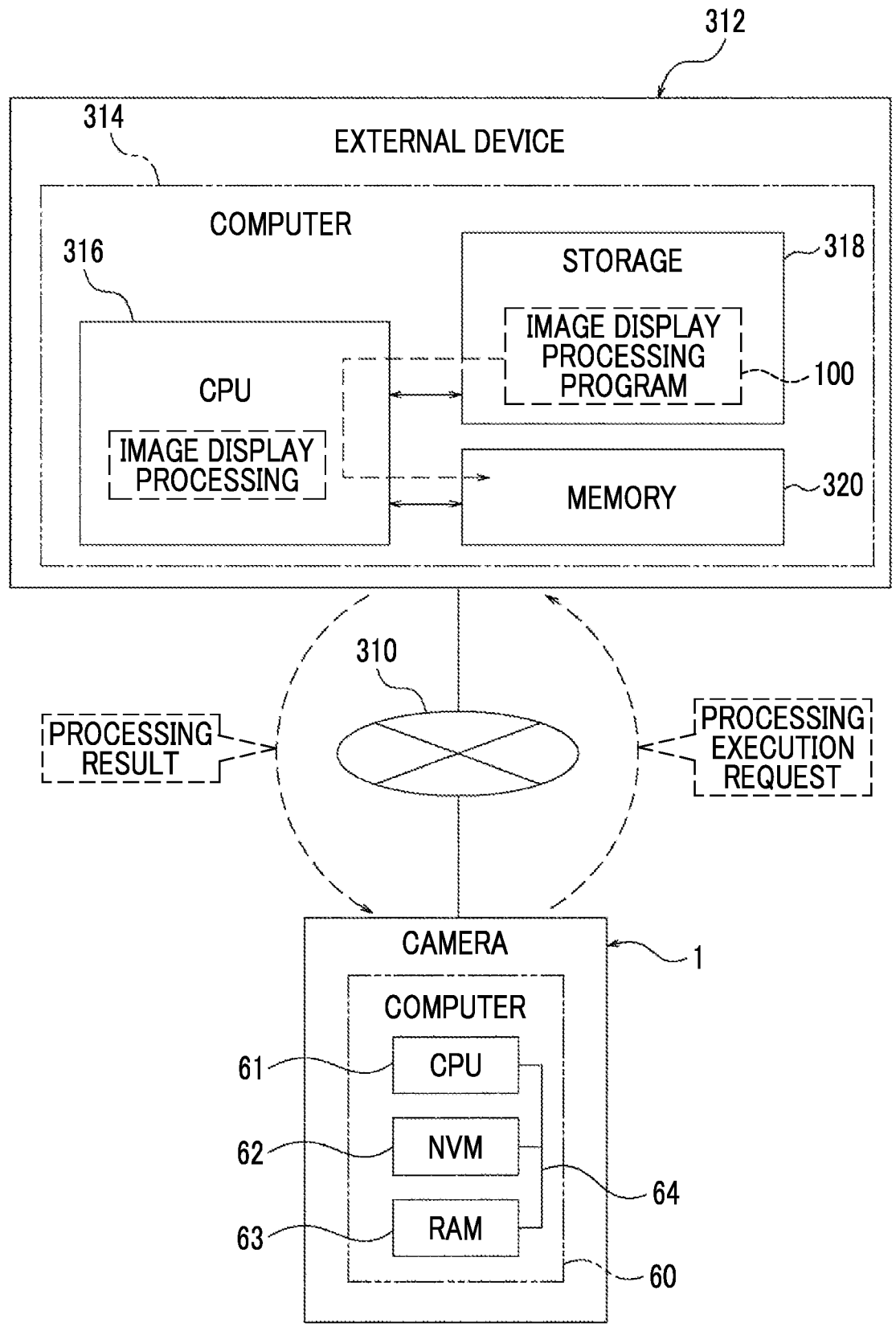
FIG. 19 is a block diagram showing an example of an electric configuration of a camera according to a first modification example.

In addition, in above-described embodiment, a form example in which the image display processing is executed by the computer 60 in the camera 1 has been described, but the technology of the present disclosure is not limited to this. For example, as shown in FIG. 19, the image display processing may be executed by a computer 314 in an external device 312 that is communicably connected to the camera 1 via a network 310, such as a LAN or a WAN. In the example shown in FIG. 19, the computer 314 comprises a CPU 316, a storage 318, and a memory 320. The image display processing program 100 is stored in the storage 318.

The camera 1 requests the external device 312 to execute the image display processing, via the network 310. In response to this, the CPU 316 of the external device 312 reads out the image display processing program 100 from the storage 318, and executes the image display processing program 100 on the memory 320. The CPU 316 performs the image display processing according to the image display processing program 100 executed on the memory 320. Then, the CPU 316 provides a processing result obtained by executing the image display processing to the camera 1 via the network 310.

In addition, the image display processing may be executed by the camera 1 and the external device 312 in a distributed manner, or the image display processing may be executed by the camera 1 and a plurality of devices including the external device 312 in a distributed manner. In the example shown in FIG. 19, the camera 1 and the external device 312 are examples of an "imaging device" according to the technology of the present disclosure.

Figure 20:
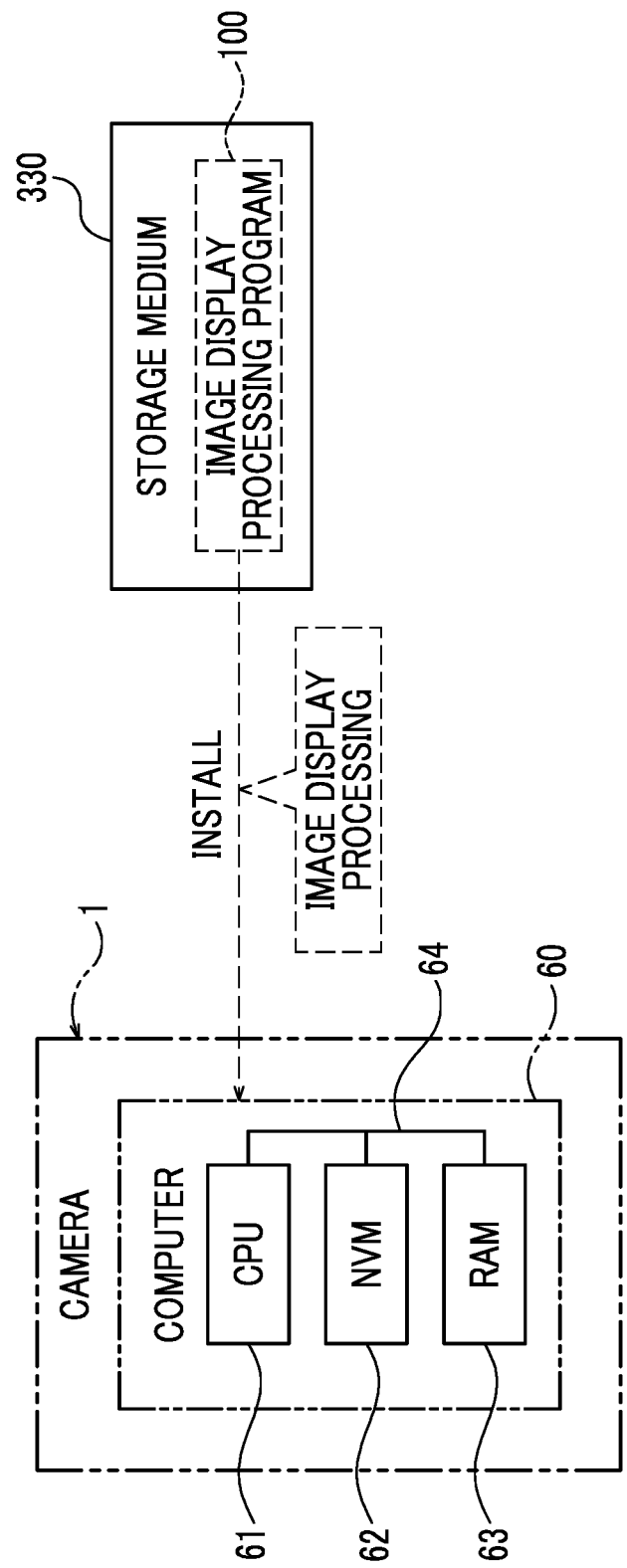
FIG. 20 is a block diagram showing an example of an electric configuration of a camera according to a second modification example.

In addition, in the above-described embodiment, a form example in which the image display processing program 100 is stored in the NVM 62 has been described, but the technology of the present disclosure is not limited to this. For example, as shown in FIG. 20, the image display processing program 100 may be stored in a storage medium 330. The storage medium 330 is a non-transitory storage medium. An example of the storage medium 330 includes any portable storage medium, such as an SSD or a USB memory.

The image display processing program 100 that is stored in the storage medium 330 is installed in the computer 60. The CPU 61 executes the image display processing according to the image display processing program 100.

The image display processing program 100 may be stored in a storage unit of another computer, a server device, or the like connected to the computer 60 via a communication network (not shown), and the image display processing program 100 may be downloaded in response to a request from the camera 1 and may be installed in the computer 60.

It is not necessary to store the entire image display processing program 100 in a storage unit of another computer, a server device, or the like connected to the computer 60 or in the NVM 62, and a part of the image display processing program 100 may be stored.

In the example shown in FIG. 20, an aspect example in which the computer 60 is built in the camera 1 has been described, but the technology of the present disclosure is not limited to this, and for example, the computer 60 may be provided outside the camera 1.

In addition, in the example shown in FIG. 20, the CPU 61 is a single CPU, but may be a plurality of CPUs. A GPU may be applied instead of the CPU 61.

In addition, in the example shown in FIG. 20, the computer 60 has been exemplified, but the technology of the present disclosure is not limited to this, and a device including an ASIC, an FPGA, and/or a PLD may be applied instead of the computer 60. Instead of the computer 60, a combination of a hardware configuration and a software configuration may be used.

As the hardware resource for executing the image display processing described in the above-described embodiment, the following various processors can be used. Examples of the processor include a CPU, which is a general-purpose processor that functions as the hardware resource for executing the image display processing by executing the software, that is, the program. In addition, examples of the processor include a dedicated electric circuit which is a processor having a circuit configuration designed to be dedicated to executing specific processing, such as an FPGA, a PLD, or an ASIC. A memory is also built in or connected to any processor, and any processor executes the image display processing by using the memory.

The hardware resource for executing the image display processing may be configured of one of those various processors or may be configured of a combination of two or more processors of the same type or different types (for example, a combination of a plurality of FPGAs or a combination of a CPU and an FPGA). In addition, the hardware resource for executing the image display processing may be one processor.

As one example of the configuration with one processor, first, there is a form in which one processor is configured of a combination of one or more CPUs and software, and this processor functions as the hardware resource for executing the image display processing. Second, as typified by an SoC, there is a form in which a processor that realizes functions of the entire system including a plurality of hardware resources that execute the image display processing with one IC chip is used. As described above, the image display processing is realized by using one or more of the various processors described above as the hardware resources.

As a hardware structure of these various processors, more specifically, an electric circuit in which circuit elements such as semiconductor elements are combined can be used. In addition, the image display processing is merely an example. Therefore, it is needless to say that unnecessary steps may be deleted, new steps may be added, or the processing order may be changed within the scope without departing from the gist.

The content of the above description and the content of the drawings are detailed explanations of the parts relating to the technology of the present disclosure, and are merely examples of the technology of the present disclosure. For example, description related to the above configurations, functions, actions, and effects is description related to an example of configurations, functions, actions, and effects of the parts relating to the technology of the present disclosure. Thus, it is needless to say that unnecessary portions may be deleted, new elements may be added, or replacement may be made to the content of the above description and the content of the drawings without departing from the gist of the technology of the present disclosure. In order to avoid complication and easily understand the parts relating to the technology of the present disclosure, in the content of the above description and the content of the drawings, the description regarding common general technical knowledge which is not necessarily particularly described in terms of embodying the technology of the present disclosure is omitted.

In the present specification, the term "A and/or B" is synonymous with the term "at least one of A or B". That is, the term "A and/or B" may refer to A alone, B alone, or a combination of A and B. In addition, in the present specification, in a case in which three or more matters are expressed with the connection of "and/or", the same concept as "A and/or B" is applied.

All documents, patent applications, and technical standards mentioned in the present specification are incorporated herein by reference to the same extent as in a case in which each document, each patent application, and each technical standard are specifically and individually described by being incorporated by reference.

The following appendix is disclosed with regard to the above embodiment.

APPENDIX 1

An imaging control device comprising:
a processor; and
a memory connected to or built in the processor,
in which the processor has
  a first mode in which a first image is acquired by causing an image sensor of an imaging apparatus to image first light, and
  a second mode in which a second image is acquired by causing the image sensor to image second light,
the first mode is a mode in which shape information of a subject is represented with a first gradation in the first image, and
the second mode is a mode in which temperature information of the subject is represented with a second gradation in the second image.

What is claimed is:

1. An imaging control device comprising:
a processor; and
a memory connected to or built in the processor,
wherein the processor
acquires a first image by causing an image sensor of an imaging apparatus to image first light with a first sensitivity, and
acquires a second image by causing the image sensor to image second light with a second sensitivity,
the first sensitivity is a sensitivity for representing shape information of a subject with a first gradation in the first image,
the second sensitivity is a sensitivity for representing temperature information of the subject with a second gradation in the second image, and
the first sensitivity is higher than the second sensitivity,
wherein the first sensitivity and the second sensitivity are defined based on a signal amplification factor of an imaging signal obtained by the imaging of the image sensor,
the signal amplification factor corresponding to the first sensitivity is logarithmically defined, and
the signal amplification factor corresponding to the second sensitivity is exponentially defined.

2. The imaging control device according to claim 1, wherein the shape information includes contour information.

3. The imaging control device according to claim 1, wherein the processor generates a composite image based on the first image and the second image.

4. The imaging control device according to claim 3, wherein the processor generates temperature distribution information corresponding to the temperature information, and
the composite image is an image representing the shape information and the temperature distribution information.

5. The imaging control device according to claim 4, wherein the composite image is an image in which the temperature distribution information is superimposed on the first image.

6. The imaging control device according to claim 4, wherein the temperature distribution information is information representing a temperature distribution with a visual feature amount.

7. The imaging control device according to claim 4, wherein the temperature distribution information is a translucent image.

8. The imaging control device according to claim 3, wherein the processor outputs display data for displaying the composite image on a display.

9. The imaging control device according to claim 1, wherein the processor sets a first frequency of acquiring the first image higher than a second frequency of acquiring the second image.

10. The imaging control device according to claim 1, wherein the processor changes at least one of the first sensitivity or the second sensitivity based on an instruction from an outside or information obtained from the subject.

11. The imaging control device according to claim 1, wherein the first light and the second light are near-infrared light.

12. The imaging control device according to claim 1, further comprising:
an optical element that changes an amount of light received by the image sensor,
wherein the first sensitivity and the second sensitivity are defined based on a change in the amount of light.

13. An imaging apparatus comprising:
the imaging control device according to claim 1; and
the image sensor controlled by the imaging control device.

14. An imaging control method comprising:
acquiring a first image by causing an image sensor of an imaging apparatus to image first light with a first sensitivity; and
acquiring a second image by causing the image sensor to image second light with a second sensitivity,
wherein the first sensitivity is a sensitivity for representing shape information of a subject with a first gradation in the first image,
the second sensitivity is a sensitivity for representing temperature information of the subject with a second gradation in the second image, and
the first sensitivity is higher than the second sensitivity,
wherein the first sensitivity and the second sensitivity are defined based on a signal amplification factor of an imaging signal obtained by the imaging of the image sensor,
the signal amplification factor corresponding to the first sensitivity is logarithmically defined, and
the signal amplification factor corresponding to the second sensitivity is exponentially defined.

15. A non-transitory computer-readable storage medium storing a program causing a computer to execute a process comprising:
acquiring a first image by causing an image sensor of an imaging apparatus to image first light with a first sensitivity; and
acquiring a second image by causing the image sensor to image second light with a second sensitivity,
wherein the first sensitivity is a sensitivity for representing shape information of a subject with a first gradation in the first image, the second sensitivity is a sensitivity for representing temperature information of the subject with a second gradation in the second image, and the first sensitivity is higher than the second sensitivity, wherein the first sensitivity and the second sensitivity are defined based on a signal amplification factor of an imaging signal obtained by the imaging of the image sensor, the signal amplification factor corresponding to the first sensitivity is logarithmically defined, and the signal amplification factor corresponding to the second sensitivity is exponentially defined.

* * * * *